United States Patent [19]

Clark

[11] 4,449,201

[45] May 15, 1984

[54] GEOMETRIC PROCESSING SYSTEM UTILIZING MULTIPLE IDENTICAL PROCESSORS

[75] Inventor: James H. Clark, Palo Alto, Calif.

[73] Assignee: The Board of Trustees of the Leland Stanford Junior University, Stanford, Calif.

[21] Appl. No.: 259,017

[22] Filed: Apr. 30, 1981

[51] Int. Cl.³ .............................................. G06F 15/20
[52] U.S. Cl. .................................................. 364/900
[58] Field of Search ... 364/200 MS File, 900 MS File, 364/515, 518, 521, 754, 718, 748

[56] References Cited

U.S. PATENT DOCUMENTS

| | | | |
|---|---|---|---|
| 3,684,876 | 8/1972 | Sutherland | 364/700 |
| 3,732,557 | 5/1973 | Evans et al. | 340/710 |
| 3,763,365 | 10/1973 | Seitz | 364/754 |
| 3,816,726 | 6/1974 | Sutherland et al. | 364/515 |
| 4,217,657 | 8/1980 | Handly et al. | 364/748 |
| 4,237,532 | 12/1980 | Borgerson et al. | 364/200 |
| 4,272,808 | 6/1981 | Hartwig | 364/718 |
| 4,283,765 | 8/1981 | Rieger | 364/521 |
| 4,330,834 | 5/1982 | Murphy | 364/521 |

OTHER PUBLICATIONS

"Bit-Sliced Microprocessor Architecture," N. A. Alexandridas, *Computer*, pp. 56-76, Jun. 1978.
"Instance Rectangles and Picture Structure," W. M. Newman, *Proceedings of the Conference on Computer Graphics, Pattern Recognition and Data Structure*, May 1975, pp. 297-301.
"A Three Dimensional Display Processor Design, Stowell and Garrett, *Proceeding of the Conference on Computer Graphics,*" Pattern Recognition and Data Structure, May 1975, pp. 157-162.
"Reentrant Polygon Clipping," *Communication of the ACM*, vol. 17, No. 1, pp. 32-42, Jan. 1974.
"Introduction to VLSI Systems", Mead and Conway, *Addison-Wesley Publishing Company,* 1980.
"Interactive Computer Graphics, Data Structures, Algorithms, Languages," *Prentice-Hall, Inc.,* 1977.
"A Clipping Divider," Sproull and Sutherland, *Proceedings, Fall Joint Computer Conference,* 1968, p. 765.
"Computer-Aided Design," Clark, Twelfth Annual Meeting, *Stanford Computer Forum,* Feb. 1980.
"Structuring a VLSI System Architecture," Clark, *Lamda,* 2nd Quarter, 1980, pp. 25-30.
"A VLSI Geometry Processor for Graphics," Clark, *Computer,* Jul. 1980, pp. 59-67.
"A VLSI Geometry Engine for Computer Graphics," Clark, *Conference on Advanced Research in Integrated Circuits,* Jan. 28-30, 1980, M.I.T.

*Primary Examiner*—Jerry Smith
*Assistant Examiner*—Mark P. Watson
*Attorney, Agent, or Firm*—Flehr, Hohbach, Test, Albritton & Herbert

[57] ABSTRACT

A graphic display system uses a plurality of identical processor units each of which is controlled by microcode to perform a particular function in transforming, clipping, and scaling geometric data for presentation on a display. Each processor includes a plurality of function units which can operate independently, in parallel, or in master-slave mode. Each function unit comprises a plurality of one bit slice circuits which can be fabricated using VLSI techniques. Each one bit slice includes a multilevel memory which collectively provide a dispersed stack for the function unit.

6 Claims, 9 Drawing Figures

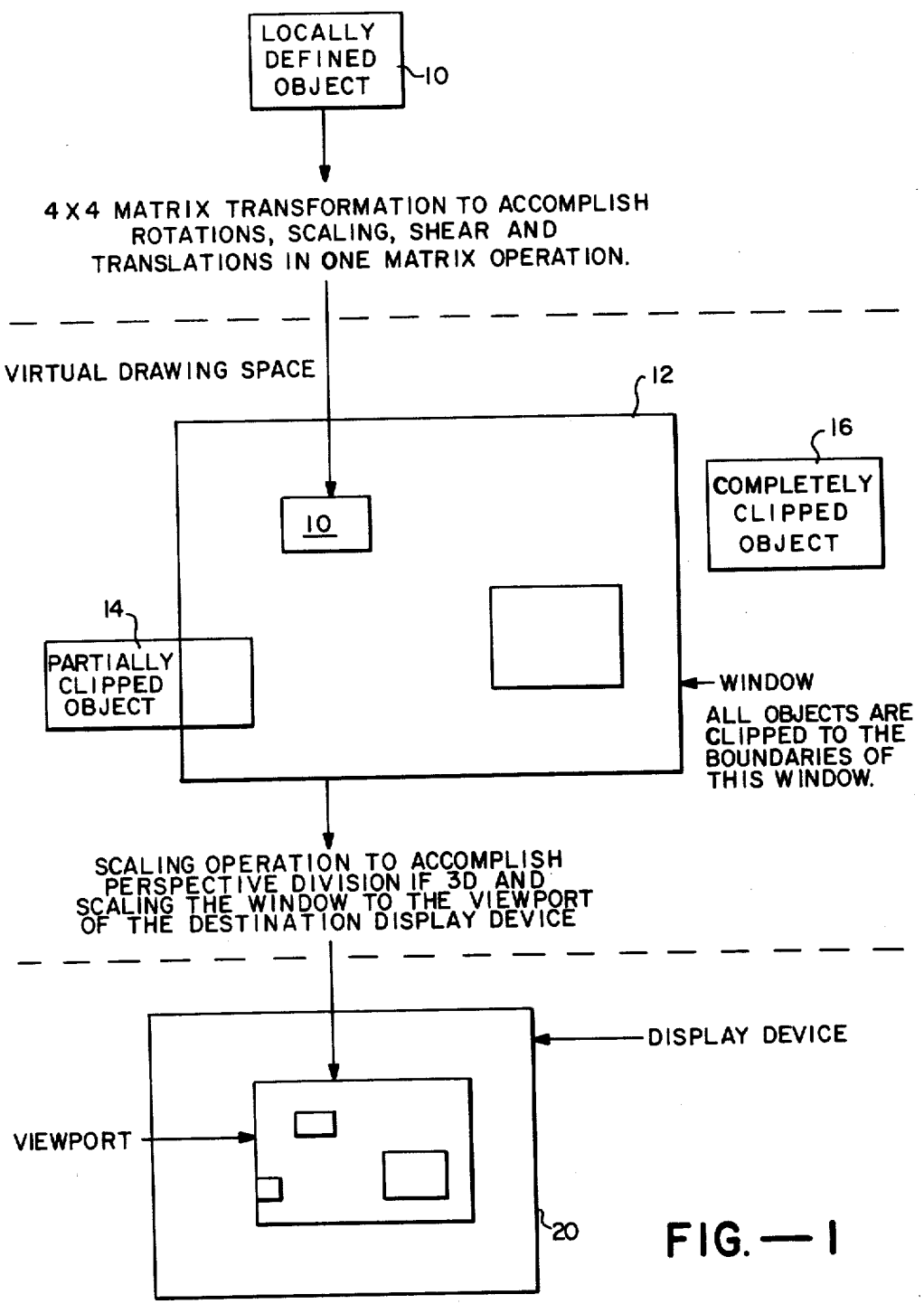
FIG.—1

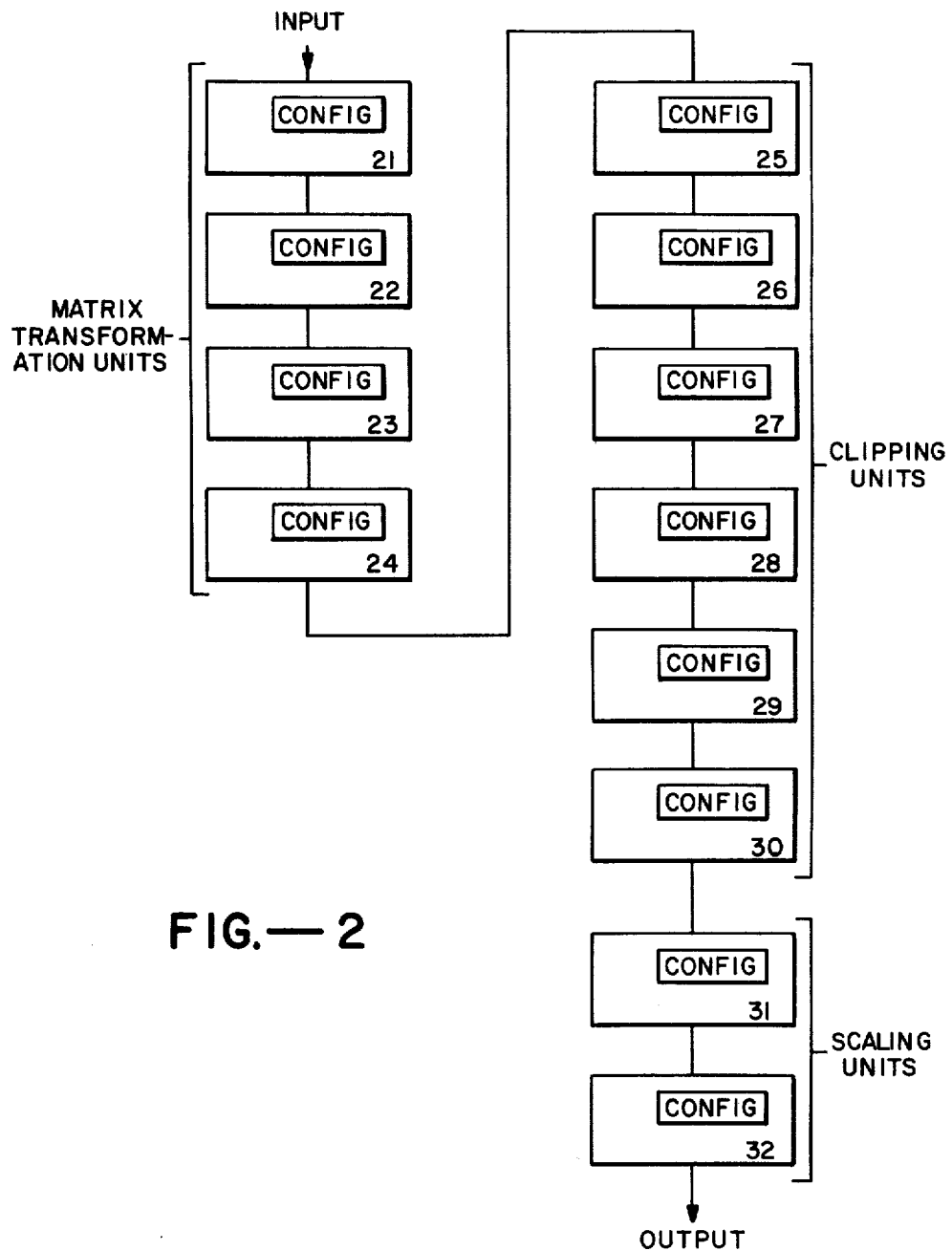
FIG.—2

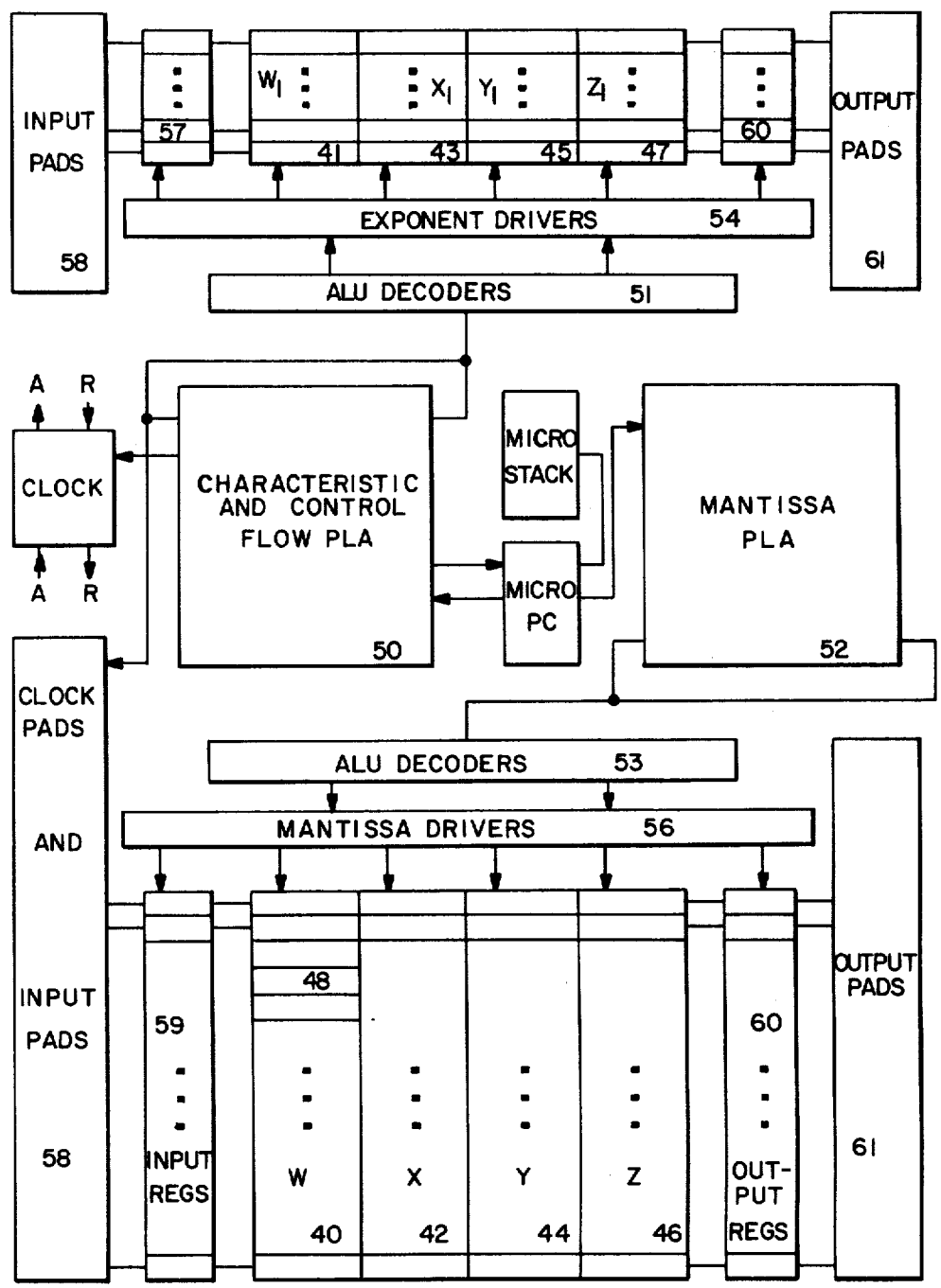
FIG. —3

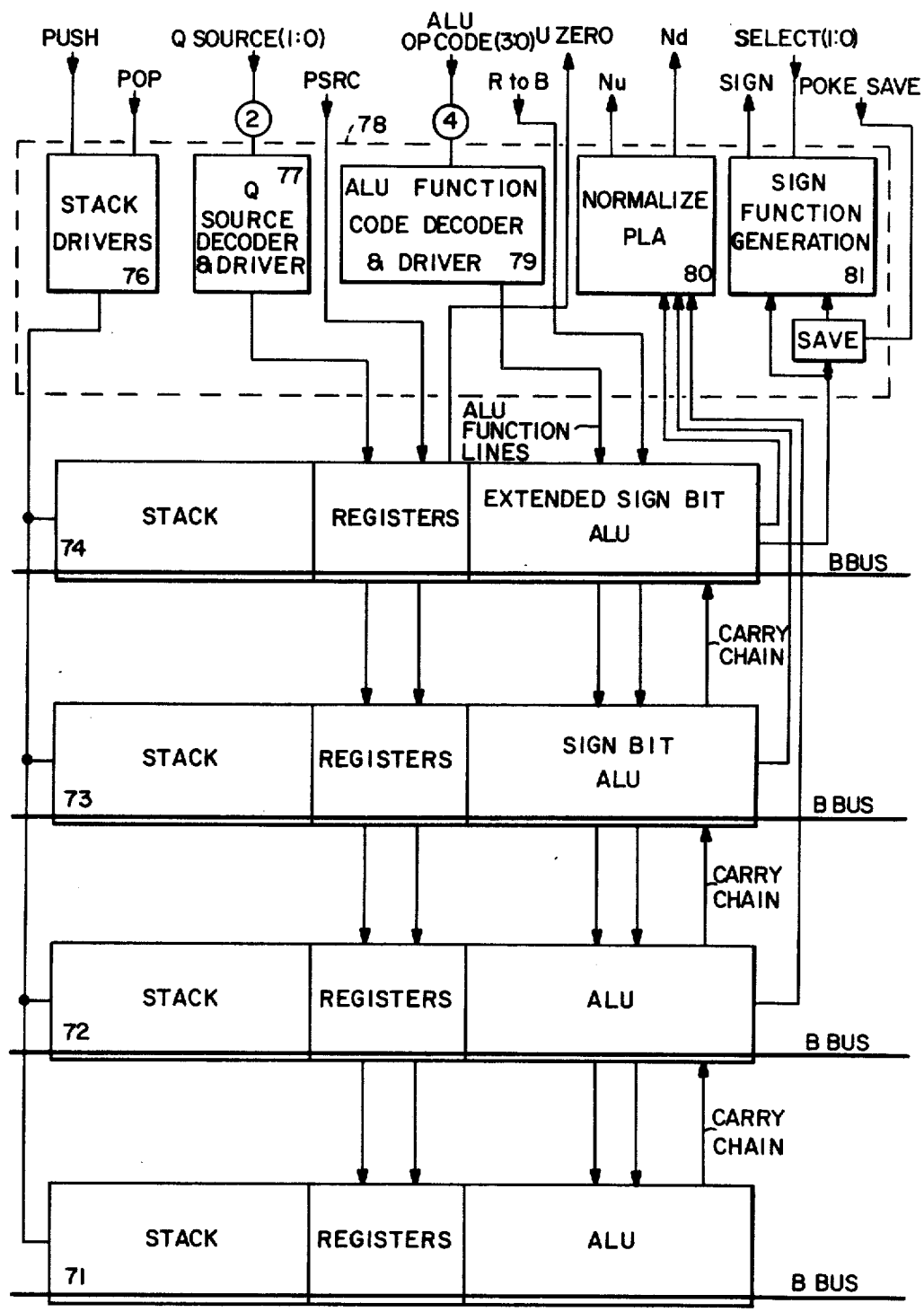
FIG.—4

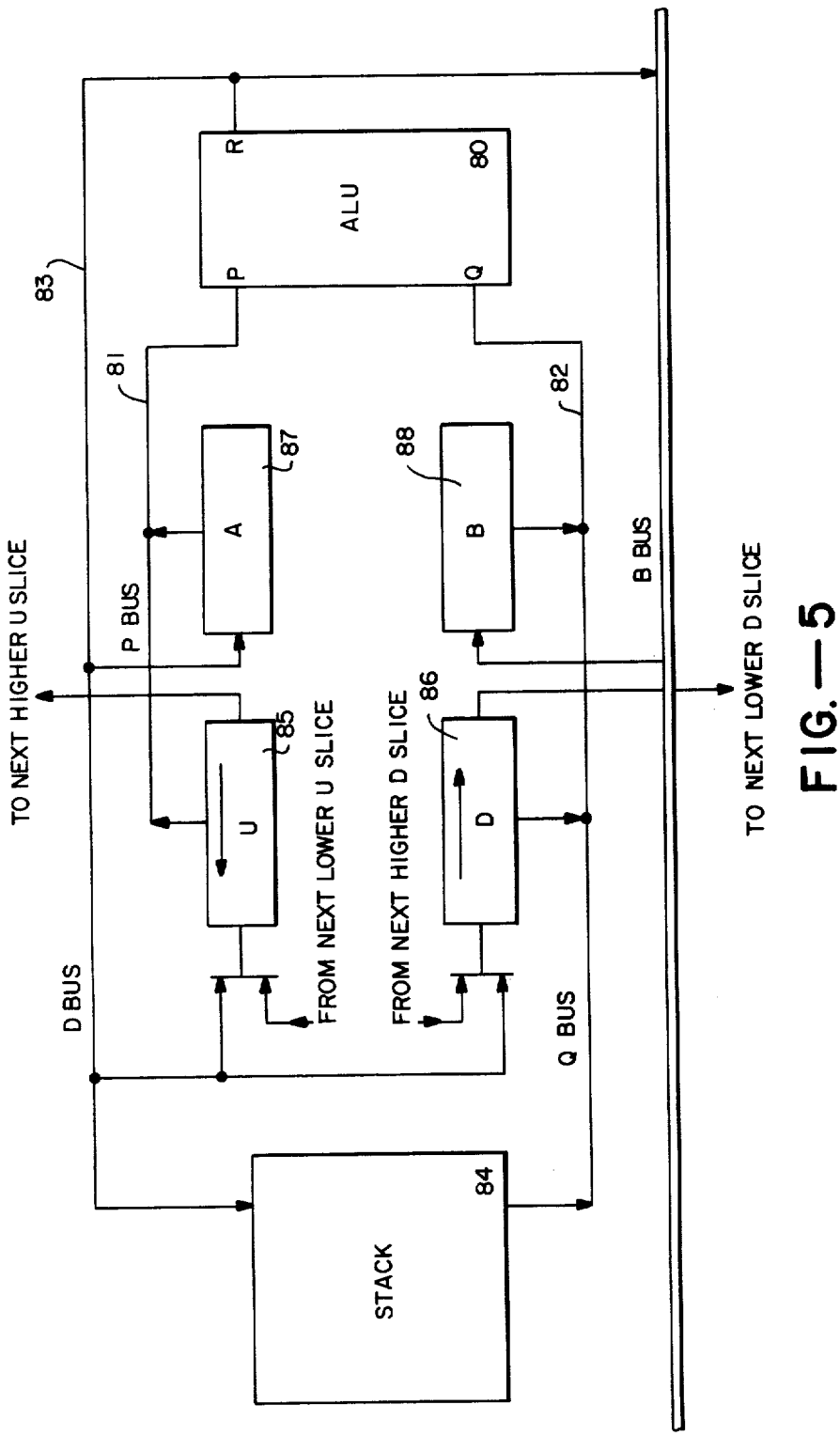

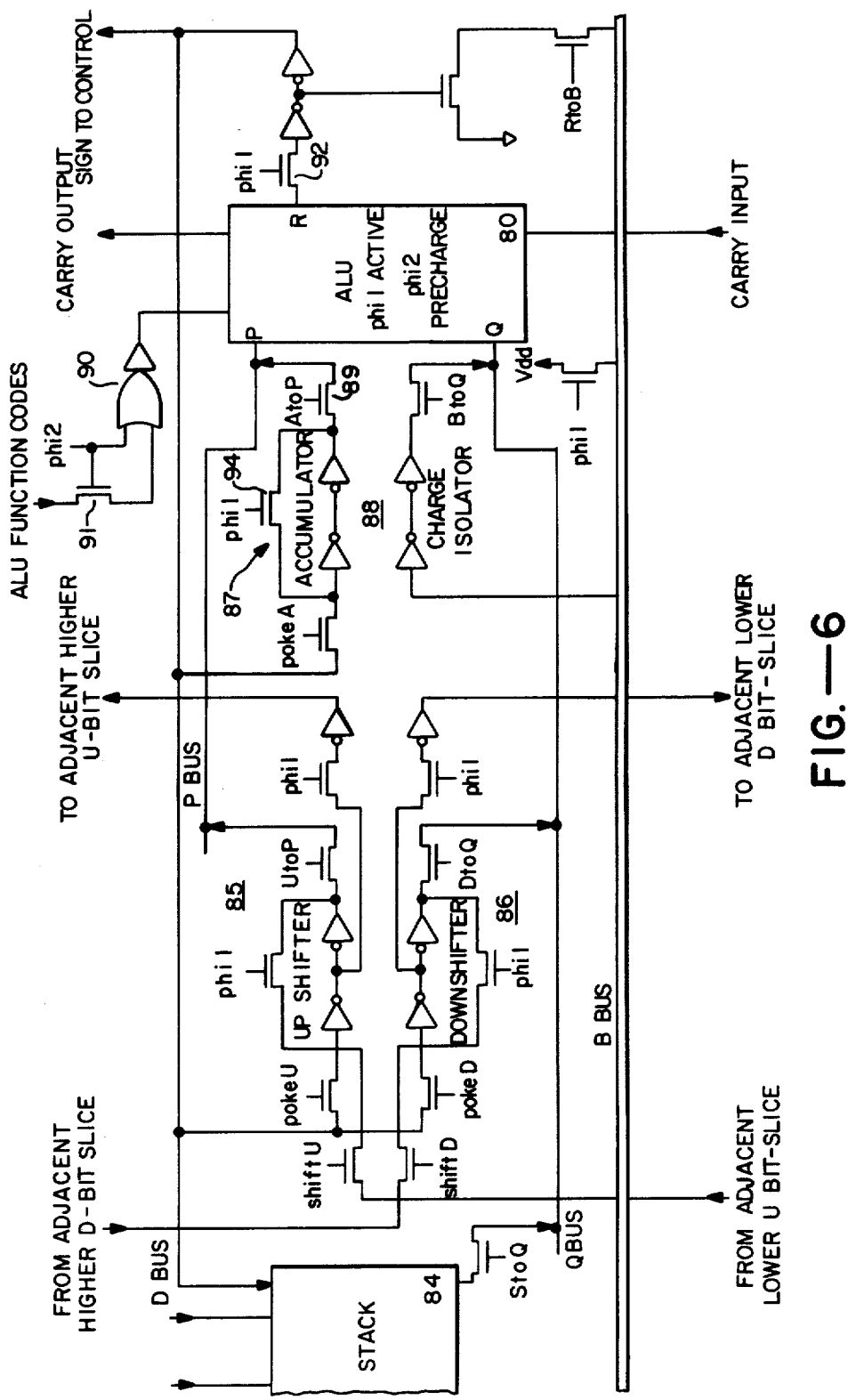
FIG.—6

MATRIX MULTIPLIER:
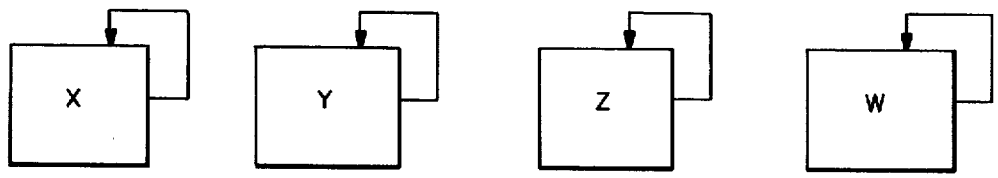
FIG.—7A
CLIPPER:
$$v(t) = (v_2 - v_1) \cdot t + v_1$$
$$t = \frac{D_1}{D_2 - D_1}$$
$D_1$ = PLANE EQUATION AT END POINT 1
$D_2$ = PLANE EQUATION AT END POINT 2
ONE CONTROL, THREE SLAVE.
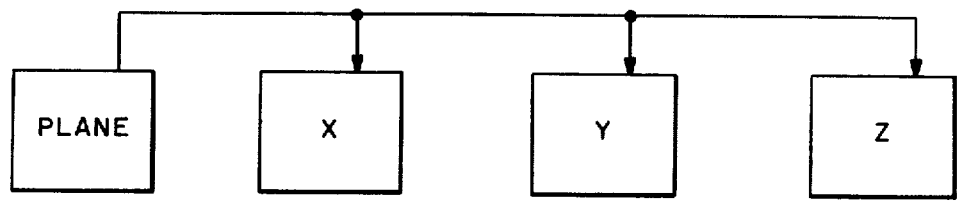
FIG.—7B
SCALER:
$$\left[\frac{X}{W}\right] \cdot Vsx + Vcx \qquad \left[\frac{Y}{W}\right] \cdot Vsy + Vcy$$
TWO CONTROL, TWO SLAVE.
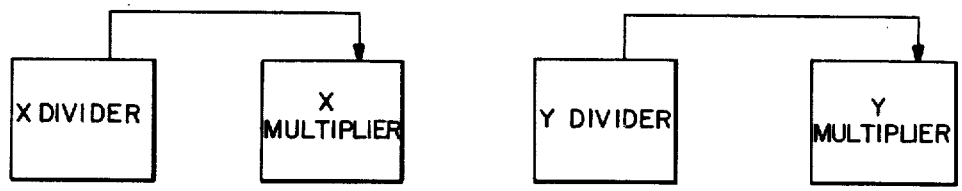
FIG.—7C

GEOMETRIC PROCESSING SYSTEM UTILIZING MULTIPLE IDENTICAL PROCESSORS

The U.S. Government has rights in this invention pursuant to ARPA Contract No. MDA 903-79-C0680.

BACKGROUND OF THE INVENTION

This invention relates generally to computer-controlled graphic display systems, and more particularly the invention relates to a processor and graphic system which utilizes the processor.

In graphic systems where geometric data is utilized for the presentation of images on a display, basic functions include coordinate transformation of the geometric data, clipping the transformed data to the boundaries of a viewing window, and scaling the clipped data to a rectangular region of the destination drawing device or display surface. For realtime graphics, special-purpose data processors or digital computers are required to timely handle the computation intensive tasks.

Special-purpose digital computers have been available in recent years for performing the requisite computation in graphic display systems. However, present commercially available computers for graphics processing are complex and expensive compared to architectures that could be structured to optimally utilize state of the art semiconductor processing techniques including very large scale integration (VLSI).

For maximum utilization of VLSI processing, the computer architecture must comprise a simple, repeating circuit configuration. Further, parallelism of compution capability should be available to maximize computation speed. Present commercially available systems do not fully utilize these capabilities.

SUMMARY OF THE INVENTION

Accordingly, an object of the invention is a graphic display system which utilizes a plurality of identical processor units which are readily structured for different computational tasks.

Another object of the invention is an improved processor for use in graphic display systems.

Still another object of the invention is a graphic display processor which is readily implemented using VLSI techniques.

Yet another object of the invention is a processor which comprises a plurality of function units for parallel data processing.

Another object of the invention is a graphics processor including a plurality of function units each of which comprises repetitive circuit blocks for the collective operation on digital data.

A feature of the invention is a bit slice circuit for operating on one bit of digital data.

Another feature of the invention is a function unit comprising a plurality of bit slices for operating on digital data in accordance with a microcode.

Another feature of the invention is the use of two of these function units for simultaneously operating on the two parts of floating-point data: a mantissa unit and a characteristic unit.

Yet another feature of the invention is a bit slice circuit including a multilevel memory whereby a computer comprising the bit slice circuits has a dispersed stack.

Briefly, in accordance with the invention a graphic display processing system is provided for transforming coordinates of geometric data, clipping the geometric data for selected viewing, and scaling the clipped data for presentation on a viewing screen. Each of the functions is achieved by a plurality of architecturally identical processors which are selectively controlled to implement the desired function.

More particularly, a processor in accordance with the invention and which may provide any of the functions in a graphic display system comprises a plurality of identical function units which can be independently operated, operated in parallel, or operated in a master-slave mode. Each function unit comprises a plurality of one bit slice circuits each including arithmetic logic means for operating on a bit of data and with each one bit slice circuit interconnected with at least one adjacent one bit slice circuit for cooperatively operating on a next most significant bit of multiple bit data.

In accordance with another feature of the invention each one bit slice circuit includes a multiple level storage means which cooperatively function as a dispersed data stack for the function unit. The arithmetic logic unit has two inputs and one output. A first bus and a second bus are provided to the first and second inputs of the ALU, respectively, and a third bus is provided to the ALU output.

An upshifting register having an input and an output is operatively connected to receive a data bit from a lower order circuit and transfer the data bit to the first bus, and the upshifting register is also operatively connected to receive a data bit from the third bus and transfer the data bit to a higher order circuit.

Similarly, a downshifting register has an input and an output operably connected to receive a data bit from a higher order circuit and transfer the data bit to the second bus, with the downshifting register also interconnected to receive a data bit from the third bus and transfer the data bit to a lower order circuit.

An accumulator register is interconnected between the third bus and the first bus for accumulating a data bit from the ALU output and reapplying the data bit to the first input of the ALU. An interface register is connected to the second bus for transferring a data bit from an input-output bus to the second bus.

By operating a plurality of one bit slice circuits together, a multiple bit data word can be selectively manipulated under microcode control.

The invention and objects and features thereof will be more readily apparent from the following detailed description and appended claims when taken with the drawings.

BRIEF DESCRIPTION OF THE DRAWINGS

FIG. 1 is a pictorial representation of the functions of a graphic display system in receiving and presenting geometric data to a display.

FIG. 2 is a functional block diagram of a graphic display system utilizing a plurality of identical processors in accordance with the present invention.

FIG. 3 is a functional block diagram of a graphics processor in accordance with the present invention.

FIG. 4 is a functional block diagram of a portion of a function unit in the processor of FIG. 3.

FIG. 5 is a functional block diagram of a one bit slice circuit as used in the function unit of FIG. 4.

FIG. 6 is a detailed circuit diagram of the one bit slice circuit of FIG. 5.

FIGS. 7A-7C illustrate the operation of the function units of the processor of FIG. 3 in carrying out the functions illustrated in FIG. 1.

DETAILED DESCRIPTION OF THE PREFERRED EMBODIMENT

System Overview

The operation of a graphics display system in accordance with the invention is illustrated pictorially in FIG. 1. Objects defined geometrically in a first coordinate system are received and transformed to a second coordinate system which is compatible with the display system. For example, the object 10 defined in X, Y, and Z coordinates is transformed and rotated into a virtual display coordinate system. After transformation of the coordinates, a viewing window 12 is defined in the virtual drawing space whereby the transformed objects mapped in the drawing space are restricted to the window by clipping or removing data which fall outside of the viewing window. For example, assuming that the object 10 is mapped completely within the window 12, all of object 10 will be displayed. However, an object 14 which lies both within the viewing window 12 and outside of the window will be clipped at the plane which defines the left side of window 12. An object 16 which lies completely outside of the viewing window will be clipped in its entirety and not displayed. For two dimensional objects, the clipping requires four separate operations, namely the left plane, the right plane, the top plane, and the bottom plane. For a three dimensional presentation two additional operations may be added for the front and back viewing planes.

Thereafter, the viewing window and objects defined therein must be scaled to the viewport of the destination display device 20. Thus, if the viewing window 12 is to occupy less than all of the viewing space 20 then the coordinates must be reduced in scale and defined for the portion of the display 20 where the window and objects therein are to be displayed.

FIG. 2 is a functional block diagram of a graphics display system in accordance with one embodiment of the present invention for carrying out these functions. In this embodiment the system comprises 12 architecturally identical processors with four processors 21-24 performing the matrix transformation, six processors 25-30 performing the clipping, and two processors 31, 32 performing the scaling of geometric data. As will be described further hereinbelow, each processor is provided with the microcode for performing any of the requisite functions, and configuration registers are provided to define the microcode and hence the function for each processor.

Algorithms required for performing the transformation, clipping, and scaling functions are knwon. See for example Giloi, *Interactive Computer Graphics Datastructures, Algorithms, Languages,* Prentise Hall Inc, 1978, pages 84-107 and Newman and Sproull, *Introduction to Computer Graphics* Addison-Wesley, 1979, pages 333 and 342. As disclosed by Giloi, a convenient way to accomplish two, three or four dimensional coordinate transformation is with a four by four matrix. The matrix allows the combined transformations of rotation, scaling, translation and perspective, all by one single matrix multiplication. The matrix multiplication operation is expressed as four simultaneous dot-product operations, one for each column of the 4×4 transformation matrix. That is, the operation $$[x\ y\ z\ w] \begin{bmatrix} a_x & a_y & a_z & a_w \\ b_x & b_y & b_z & b_w \\ c_x & c_y & c_z & c_w \\ d_x & d_y & d_z & d_w \end{bmatrix} = [x'\ y'\ z'\ w']$$

is accomplished by four dot-product units. Processor 21 performs the dot-product of $[x\ y\ z\ w]$ with $[a_x\ b_x\ c_x\ d_x]$ to produce $x'$, processor 22 performs the dot-product of $[x\ y\ z\ w]$ with $[a_y\ b_y\ c_y\ d_y]$ to produce $y'$. Similarly, processor 23 produces $z'$ and processor 24 produces $w'$.

Processor 21 holds a stack of $[a_x\ b_x\ c_x\ d_x]$ values. The top of this stack is the "current" first column of the matrix. Similar stacks are provided for processors 22-24 for the y, z, and w columns, respectively. Commands provide for pushing the top of this stack down, PUSHMM, popping the level of the stack by one, POPMM, loading a new column onto the stack, LOADMM, and multiplying the existing matrix on the top of the stack by a new incoming matrix. All of these commands are described in the microcode, infra.

As discussed by Newman and Sproull, the four by four matrix allows rotations, scaling, translations, and a number of other transformations to be done with a single entity. It also conveniently handles two and three dimensional objects, and two successive transformations can be composed by a single multiplication of the transformation matrices. Four processors can transform an incoming four component vector into a four component vector expressed relevant to a coordinate system that is fixed to the observer.

After transformation, the geometric data is clipped by the use of an algorithm that determines which part of the data lies within window boundaries. For points, if the point is inside the screened area it is displayed; otherwise it is suppressed. For lines, there are several possibilities: the line is totally in, totally out, or part in and part out. The clipping operation is to determine which of these cases apply and if it is the last, determine the points where the line enters the window, or crosses the plane in question. This "clipping" operation is done by a logarithmic search for the point of intersection of the line segment and the plane. See Knuth, Donald E., *Sorting and Searching,* Vol. III, Addison-Wesley Publishing Company, 1973, page 422.

For three dimensions the window is a set of planes that extend outwardly from the eye of the observer; these planes can be thought of as extending through the rectangle defined by a two dimensional boundary with the window representing the part of the picture that is to be mapped onto the destination display. The six processors 25-30 hold the plane equations for the end points of a line with the sign of the plane equation for each point telling which side of the plane the point is on. By convention, this sign is chosen to be negative if the point is on the "outside"of the plane, meaning that it is not visible to the observer because it is outside of the window. Thus, a line segment having both signs negative is completely out of the viewing area while one having both signs positive is completely in the viewing area. The function of the clipper is to discard segments that are completely outside of its plane, pass segments that are completely inside, or find the point of intersection of the segment with the plane and pass results. Assuming a three dimensional representation, the six processors 25-30 are required for testing line segments against the left and right planes of the window, the top and bottom planes of the window, and the front and back planes of the window. When a segment crosses a plane, the processor finds the intersection point by a logarithmic search for the point. That is, on each microcycle each of the four units (the plane equation unit and the three coordinate units) computes the midpoint of its representation of the line. Choosing one of the end points as a reference point, it then determines if the midpoint is on the same side of the plane as this point. If so, then the reference point is updated by moving it to the midpoint. This is repeated until the precision of the mantissa is reached. A similar algorithm is disclosed by Sproull and Sutherland, "A Clipping Divider," *Proceedings of the FJCC*, 1968.

The function of scaling is accomplished by the two processors 31 and 32. The scaling operation scales objects remaining after clipping from the window to a viewport, which is expressed in the integer coordinate system of the destination display. In three dimensions, both perspective division and scaling to destination device coordinates simultaneously take place. In two dimensions only scaling is done. The perspective division/scaling operation requirement can be accomplished for two coordinates in a single processor in accordance with the invention. However, for three dimensional scaling the second processor is required. For example, the scaling operations for the coordinates are given as $$X = \left(\frac{x}{w}\right)^* V_{sx} + V_{cx}$$

$$Y = \left(\frac{y}{w}\right)^* V_{sy} + V_{cy}$$

$$Z = \left(\frac{z}{w}\right)^* V_{sz} + V_{cz}$$

A processor behaving as a scaling processor requires two of the computation units, one to accomplish the divide operation, e.g. x/w, and the other to accomplish the multiplication of this quotient with $V_{sx}$. Rather than do the complete divide before doing the multiply, however, each bit of the quotient, starting with the most significant bit, is used to govern the addition of the successive partial products in accumulating the product, as discussed by Sproull & Sutherland, supra.

Processor

Having now described an overview of the graphics display system and functions thereof, consider now a processor in accordance with the invention for use in the system. FIG. 3 is a functional block diagram of the processor which comprises four identical function units labeled W (40–41), X (42–43), Y (44–45), and Z (46–47) with each function unit including a characteristic portion (8 bits) and a mantissa portion (24 bits). As will be described further hereinbelow, each function unit comprises a plurality of one bit slice circuits, 48 each for operating on a bit of the characteristics or the mantissa. The particular function of the processor is defined by a characteristic and control flow program logic array 50 and a mantissa program logic array 52. While shown as separate units, PLA 50 and PLA 52 can be a single unit. ALU decoders 51 and 53 receive the microcode from PLA 50 and PLA 52, respectively, and provide the control to the W, X, Y, and Z function units through drivers 54 and 56. Input pads 58 provide data through input registers 59 to the function units, and data is transferred from the function units through output registers 60 to output pads 61.

Data are presented at the 16 input pins 58 connected to input registers 59. Then an input request is made by raising the request flag Rin. A four-cycle "handshake" is completed by the clock circuit, as described in Chapter 7 of Mead & Conway, Intro. to VLSI Systems, Addison-Wesley Publishing Company, 1980. First, the high order bits are latched into the 16 bits of 59. On the next microcycle, all 32 input bits, the 16 high-order bits plus the input pin values, are transferred over the B bus (I/O bus) to the appropriate computing unit, w(40,41), x(42,43), y(44,45) or z(46,57).

On output, data are transferred via the B bus to the output registers 60. On the first cycle, the high order 16 bits are presented at the output pins 61 and a 4-cycle handshake for output is initiated. Then the low order bits of 60 are transferred to 61.

Each computing unit consists of two identical function units with different numbers of bits, e.g. the X computing unit is the 8-bit characteristic function unit 43 and the 24-bit mantissa function unit 42.

The ALU decoders 53 receive a 4-bit code and generate 3-bit values for driving the control lines of the mantissa ALU's in 40–46 (even). Likewise, decoders 51 receive a 4-bit code for generating the control signals of 41–47 (odd).

Function Units

As indicated above, each function unit comprises a plurality of one bit slice circuits with each circuit operating on one bit of a data word. FIG. 4 is a functional block diagram of a portion of a function unit showing four one bit slices 71–74 with each slice including a multi-level storage or stack, a plurality of registers, and an arithmetic logic unit (ALU). The ALU is conventional as described by Mead and Conway, *Introduction to VLSI Systems*, Boston: Addison Wesley 1980. Carry chains are provided between adjacent one bit slice circuits as required for the next most signifcant bit and the next least significant bit, respectively. PLA control of the function unit is accomplished through stack drivers 76 which control push and pop operations of the stack, a Q source decoder 77, a P bus enable 78, and an ALU function decoder 79. Signals from the function units to the PLA, designated Nu (normalize up) and Nd (normalize down) are provided through a PLA 80 (designated normalize PLA), and a sign function PLA 81 controls the sign signal. Each one bit slice is connected to a common bus designated B bus.

Each of the four Characteristic Function Units and each of the four Mantissa Function Units has the following behavior. However, the Nu and Nd (Normalize Up and Normalize Down) and UZero outputs of the characteristic units are not used by the Control.

During each microcycle of the machine, signals come out of the Control PLA that drive each of the inputs to the function unit shown. That is, each of the following inputs are driven on each microcycle:

Push—push the output of the ALU onto the Data Stack.

Pop—pop the data stack.

Qsource[1:0]—enable one of (Stack, Bbus, or D) onto Q bus.

Psource—enable one of A or U onto P bus.

ALU OpCode[3:0]—selects one of the 9 ALU functions:
P plus Q
P minus Q
Minus P plus Q
Pass P
Pass Q
P minus 1
Q minus 1
Minus P
Minus Q
PokeSave-Save the current sign bit of the ALU in SaveBit
Select[1:0]-select one of the sign functions:
Same—Sign=(SignBit=SaveBit).
Sign—Sign=SignBit.
Save—Sign=SaveBit.
R to B-Transfer the ALU output to the Bbus.

Each microcycle of the machine, a function unit generates the following inputs to the PLA:
Nu—Normalize up=(A and B and C') or (A' and B' and C)
Nd—Normalize down=(A and B') or (A' and B).
Sign—the sign according to Select given above
Uzero=1 if the uregister is all zero bits.

One Bit Slice

FIG. 5 is a block diagram of one of the one bit slices which comprise the function unit. The circuit includes the ALU 80 having a first input (P) and a second input (Q) and one output (R). A first bus 81 is provided to the P input and a second bus 82 is provided to the Q input. A third bus 83 is connected to the ALU output. The multiple level stack 84 has an input connected to the bus 83 for receiving data from the ALU output, and the stack has an output connected to the bus 82 for loading the Q input of ALU 80. An upshifting register 85 is connected to the bus 83 for transferring data to the next most significant bit slice circuit, and register 85 is connected to receive data from the next lower significant bit circuit for application to bus 81. Similarly, a downshifting register 86 is connected to receive a bit from the next most significant slice circuit for transfer to bus 82, and the register 86 also is connected to receive data from bus 83 for transfer to the next lower significant bit circuit. An accumulator register 87 is connected to bus 83 for reapplying data to input bus 81, and an isolation register 88 is connected to the common B bus for transfer of external data to bus 82.

FIG. 6 is a detailed circuit diagram of the one bit slice illustrated in FIG. 5 and further illustrates the registers (comprising serially connected inverters) and the signal designations for control of the registers, the stack, and the ALU. The same numerals are used for like elements in FIG. 5.

Operation of the bit-slice is illustrated by a simple example such as causing the Accumulator to have one added to it. At the beginning of phase 2 of the clock (phi 2), the value of the accumulator is enabled onto the P bus via A to P (89). During this phase of the clock, the carry-chain of the ALU is also precharged (90), the value of the P bus is latched into the input register of the ALU, and the ALU function code (P plus 1) is enabled to the ALU function drivers (91). Then the phi 1 phase of the clock is enabled, during which the ALU generates the sum, and at the end of this phase of the clock, the output of the ALU is enabled via 92 onto the R bus. The result is then loaded into the accumulator via poke A (93) on the next phase 2 of the clock phi 2. The clock may stop any time during phase 1, and 94 ensures that the accumulator's contents are kept static.

Function Unit Operation

FIGS. 7A-7C illustrate the operation of the four computation units of each processor in carrying out the coordinate transformations, clipping, and scaling. In FIG. 7A the transformation is accomplished by the four by four matrix multiplication with each function unit X, Y, Z, W operating independently in carrying out the matrix multiplication. The parallelism capability of the function units of the processor working independently decreases the time requirement in performing the transformations. As part of the transformation, each processor uses the four function units to perform a dot product of the two four component vectors. One of the four component vectors is the graphical input point that is to be transformed from the object's definition coordinate system into the user's virtual drawing space, while the other is one column of a four by four matrix that specifies how the incoming vector is to be transformed. This column of the matrix is held on the top of the push down stack for the computing element. The transformation units collectively hold the four columns of the matrix on the tops of the pushdown stacks. The primary operation of the processor acting as a transformation unit is the dot product operation. In addition, transformation units interpret commands to be passed on to the clipping and scaling units, commands that push and pop the top of the matrix stack, and commands that allow passage of the current matrix stack to the clipping and scaling units for temporary stack overflow. All of these operations are accomplished by the control circuitry which is stored in the control program logic arrays.

In FIG. 7B the clipping function is accomplished by three of the computation units operating as slaves to one control computation unit. The clipping operation involves determining the point of intersection of a line segment with a plane. Because the clipping operation is preceded by the transformation operation, the line whose intersection is to be computed is transformed into a coordinate system in which the expression of the plane is very simple. After trnsformation, the planes against which the line is tested have the equations:

$$W+X=0$$

$$W-X=0$$

$$W+Y=0$$

$$W-Y=0$$

$$W+Z=0$$

$$W-Z=0.$$

The only difference between the six clipping units is the particular point of the control circuitry that does the computation. Depending upon the processor's configuration register, the computer computes one of the plane equations given above for each end point of the line and stores the result in the W function unit. In general, the results of any of the above computations is not 0 because neither end point of the line segment will lie on the plane in question. The sign of the plane equation value stored in the W function unit indicates the side of the plane on which the end point lies. If both end points are on the same side of the plane then the segment is either completely inside the window or completely outside the window. If the end points are completely outside of the window, the clipping unit no longer considers the line segment and returns to its input state awaiting the next line segment or end point in a string of line segments. If the line segment is completely inside the window, the line segment is passed on to the next clipping unit or to the scaling subsystem.

If the line segment crosses the plane, the point of intersection is computed by the control circuitry as specified by a set of commands, and the resulting end-points that are inside the window are passed onto the next unit. After passing through all clipping units the resulting segment will lie completely within the window and can be passed on to the scaling unit.

FIG. 7C illustrates the scaler operation in which two computation units provide control and two computation units operate under that control. Two computation units are required for each of the coordinates being scaled. Because each processor has four computation units, one processor is used to simultaneously scale two coordinates. Thus, in two dimensional systems only one processor is required, whereas in a three dimensional system two processors are required.

The scaling operation simultaneously projects the end points of line segments onto the viewing window and maps the floating point coordinates supplied at the input into integer coordinates relative to the coordinate system of the destination display device. The graphic objects that lie within the window are mapped to a rectangular area of the destination device, or the viewport. The size and location of the viewport are specified by the viewport registers. Viewport registers, stored in the pushdown stacks of the function units, specify the location and size of the viewport.

Microprogramming

The processor in accordance with the invention is a quasi general purpose, four-component vector function unit which is driven and controlled by microcode. The microcode is a representation of the logic equations in finite state language which are implemented in the logic circuitry of the program logic array (PLA). Attached hereto and incorporated by reference is a printout of the microcode for a processor in accordance with the invention which is written using the SLIM program language developed at Stanford University.

The microcode defines the behavior of the preferred embodiment. It is written in SLIM [Hennessy, John L., "A Language for Microcode Description and Simulation in VLSI", CSL Technical Report No. 193 Dept. of Electrical Engineering]. The first section is the "Environment." The second section is the actual microcode.

The main body of the microcode is identified by principal blocks marked A-X for further clarification. Block A illustrates most of the characteristics. Each block is described below.

Block A—These first few micro-instructions are executed only once each time the graphics processor is RESET. They cause the configuration register to be loaded.

1. The first line of A is used to gather simulation statistics and plays no role in the behavior of the processor.

2. The second line has three commands that define three different values in the control PLA:

Enable (Data Input)—cause the clock circuit to stop in phi 1 until an input Request, Rin, is presented. After the request is presented, the next phase, phi 2, is issued.

Poke (In Type)—cause the Configuration Register to be loaded with the low-order 6-bits of the input pins.

3. The third line enables the input registers to the B bus and calls the microcode subroutine that passes the remaining configuration register values for the remaining processors in the pipeline. Then Block B is entered.

Block B—Input a command, decode it and transfer to the appropriate block of Microcode.

1. The first line enables loading of the Command Register and the Input Register.

2. The next state (enclosing set of "[" and "]") transfers to an appropriate block of Microcode depending upon the command type.

3. The next line causes the command to be ignored if it is unrecognized.

Block C—Pass 16-bit data values through the processor unaltered.

1. Output the pass command itself only if not the last processor in the pipeline (Scale XY).

2. Enable the pass count to the B bus, call the PASSN microsubroutine.

3. Go to Start state.

4. Enable B bus to characteristic Q bus, Load A (accumulator) of w-characteristic function unit with pass count from B bus, test is count is negative and conditionally return.

5. In a single state loop, successively counting down the A register of the w-characteristic function unit until negative, pass the 16-bit value at the input pins to the output pins. Return from subroutine when count of A register goes negative.

Block D—This microcode block causes the viewport registers to be loaded if the processor is a scaler type. Otherwise, the command and data are passed through the processor.

Block E—This block is used if the input command is either a move or draw instruction and the processor is a scaling unit. The microcode prepares the input values to be scaled.

Block F—This block aligns exponents by shifting the dividend.

Block G—This is a 1-state loop that does the simultaneous multiply and divide.

Block H—This block adds the viewport offset, e.g. $V_{cx}$, to the product obtained.

Block I—This block outputs the values obtained.

Block J—Load a new, incoming matrix to the top of the matrix stack.

Block K—Store the current matrix to the output.

Block L—Microcode to push and pop the matrix stack.

Block M—Multiply the present matrix at the top of the stack with the incoming matrix. Leave the result on the top of the stack.

Block N—Do a Move or Draw Command as a matrix transformer processor.

Block O—Do Move Command as a clipping unit.

Block P—Do a Draw Command as a clipping unit.

Block Q—Logic to assist in clipping polygons.

Block R—Rearrange stack for output.

Bock S—Actual clipping micro-subroutine in which the logarithmic search in the plane intersection point is done.

Block T—Preadd subroutine used extensively to align exponents for adding or subtracting vectors.

Block U—Input/Output micro-routines.

Block V—Micro-routine to compute the value of the plane equation to be loaded into the w computing unit.

Block W—Dot-product micro-routine, used extensively by transformation processors.

Block X—Normalize micro-routine, used extensively to renormalize floating point numbers after arithmetic operations.

---

Command Set and Number Format

The Geometry System can be constructed of either 10 or 12 chips, depending upon whether it is desired to clip against Near and Far clipping planes or not. In either case, the first N instructions to the Geometry System must be of the following format:

Configuration Instruction:

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| \multicolumn{9}{Count} | | | S | C | M | \multicolumn{3}{SubType} | | |

Count - This number is one less than the number of configuration Instructions following the instruction in which it appears. The last configuration instructions has a −1 in this field.

S, C, M - Mutually exclusive bits to indicate which category of chip the present chip is in: Scaler, Clipper or Matrix Multiplier.

SubType - A number indicating which chip in the present category.

Twelve chip version:

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | | | | Count | | | | | | S | C | M | | SubType | |
| | | | | 10 | | | | | | 0 | 0 | 1 | | 1 | |
| | | | | 9 | | | | | | 0 | 0 | 1 | | 2 | |
| | | | | 8 | | | | | | 0 | 0 | 1 | | 3 | |
| | | | | 7 | | | | | | 0 | 0 | 1 | | 4 | |
| | | | | 6 | | | | | | 0 | 1 | 0 | | 0 | |
| | | | | 5 | | | | | | 0 | 1 | 0 | | 1 | |
| | | | | 4 | | | | | | 0 | 1 | 0 | | 2 | |
| | | | | 3 | | | | | | 0 | 1 | 0 | | 3 | |
| | | | | 2 | | | | | | 0 | 1 | 0 | | 4 | |
| | | | | 1 | | | | | | 0 | 1 | 0 | | 5 | |
| | | | | 0 | | | | | | 1 | 0 | 0 | | 0 | |
| | | | | −1 | | | | | | 1 | 0 | 0 | | 1 | |

Instruction:

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| X | | | HitReg | | | | | Y | | | Command | | | | |

The low order 6 bits of all Instruction words to the Geometry Engine determine the instruction to be interpreted.

| 5 | 4 | 3 | 2 | 1 | 0 |
|---|---|---|---|---|---|
| | | Command | | | |

| Command | | Description |
|---|---|---|
| 16 | * | Move — Move to point (x,y,z,w) |
| 17 | ** | Draw — Draw to point (x,y,z,w) |
| 18 | ** | Point — Draw a dot at the position (x,y,z,w). |
| 19 | | Curve — Iterate the Current curve matrix. |
| 48 | * | Movepoly — move to point (x,y,z,w) in polygon mode. |
| 49 | ** | DrawPoly — Draw to point (x,y,z,w) in polygon mode. |
| 51 | * | ClosePolygon — Close the currently open polygon. |
| 0 | | PopMM — Pop the matrix stack. |
| 1 | | LoadMM — Replace Top of Matrix Stack with incoming matrix. |
| 2 | | MultMM — Multiply top of matrix stack by incoming matrix. Product on Top. |
| 3 | ** | StoreMM — Store Top of Matrix Stack to output. Leave stack unaltered. |
| 4 | | PushMM — Push current Top of Matrix Stack. Leave top unaltered. |
| 5 | | LoadViewport — Load the incoming viewport. |
| 6 | ** | SetHitMode — Put System in hit-testing mode. |
| 7 | ** | ClearHitMode — Clear hit-testing mode. |
| 8 | | PassThru — Pass the following N+1 16-bit words through the Geometry System unaltered M is taken from the high order byte of the instruction word, according the format: |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | | | | N | | | | | | | | S | | | |

N is a number between 128 and 127.

* means that the command comes out of the Geometry System and is passed on to the output device.

** means the command comes out of the Geometry System in Hit Mode. No Data comes out in hit mode except StoreMM data.

HitReg:

| 13 | 12 | 11 | 10 | 9 | 8 |
|---|---|---|---|---|---|
| F | N | T | B | R | L |

HitReg bits indicate which planes a given draw command has been clipped against. A 1 bit indicates the corresponding plane was crossed by the draw command.

Far, Near, Top, Bottom, Right, Left = F N T B L.

Thus, if the receiving engine is in hit-testing mode, it may interpret these bits to see which planes were clipped against.

-continued

Command Set and Number Format

Geometry Engine Number Formats

Floating-point format:

word1:

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| characteristic | | | | | | | | Mantissa (0,7) | | | | | | | | word2:

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Mantissa (8,23) | | | | | | | | | | | | | | | |

The characteristic is a signed, 2's complement number in the range 128 through 127.
The mantissa is a signed, 2's complement fraction whose magnitude is in the range 0.5 through 9999999
is represented with both mantissa and characteristics of 0.

Viewport Register Format:

word1:

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| unused | | | | | | | | ViewportParam (0,7) | | | | | | | | word2:

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| ViewportParam (8,17) | | | | | | | | unused | | | | | | | |

The ViewportParam field is a signed, 2's complement 18-bit interger.

Output Format: Same as Viewport Register Format.

SUMMARY

A graphic display system utilizing a plurality of processors operating under microcode control has been described. The processor comprises a plurality of function units which can be operated independently, in parallel, or in master-slave modes and each function unit comprises a plurality of simple one bit slice circuits which are readily fabricated using VLSI techniques. The multilevel memories of the bit slice circuits cooperatively function as a dispersed stack.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

ENVIRONMENT

```
program geoproc( input*, output );

(* The command register gets the low order 6 bits of the characteristic *)
const
           MoveCode       = 16;
           DrawCode       = 17;
           PointCode      = 18;
           CurveCode      = 19;

MovePCode      = 48;
           DrawPCode      = 49;
           CloseCode      = 51;

PopMM          = 0;
           LoadMM         = 1;
           MultMM         = 2;
           StoreMM        = 3;
           PushMM         = 4;

LoadVPCode     = 5;

SetHitCode     = 6;
           ClearHitCode   = 7;
           PassThruCode   = 8;
           EndCode        = 9;

(* Function definitions *)
           PassPop        = 0;
           PassQop        = 1;
           PminusQop      = 2;
           PplusQop       = 3;
           Pminus1op      = 4;
           Pplus1op       = 5;
```

```
        MinusPop      = 6;
        MinusQop      = 7;
        MPpQop        = 8;

(*   Chip Type Codes     *)
        mm4Code = 4;
        mm1Code = 1;
        mm2Code = 2;
        mm3Code = 3;
        Clip0Code = 0;
        Clip1Code = 1;
        Clip2Code = 2;
        Clip3Code = 3;
        Clip4Code = 4;
        Clip5Code = 5;
        ScalexyCode = 1;
        ScalezCode = 0;

(*   Source Decoder codes   *)
        StoQ = 1;
        DtoQ = 2;
        BtoQ = 3;

(*   Miscellaneous constants   *)
        ExStart = 11;
        MANTSIZE = 24;
        MAXMANT = 40000000B;
        NumPins = 15;
        TWO16 = 32768;
        TWO16M1 = 32767;

(*   bit positions for hit bits in HitReg for 36-bit machine   *)
        wordsize = 36;
        b0 = 35;
        b1 = 34;
        b2 = 33;
        b3 = 32;
        b4 = 31;
        b5 = 30;

type
        bitregister = record xc,yc,zc,wc: record ch,ma: boolean end end;

fpnum = record ch: -128..127; ma: integer end;
        register = record
                xc,yc,zc,wc: fpnum
            end;

BufType = record ch: -128..127; ma: real  end;
        component=(x,y,z,w,all);
        part = (m,c,both);

SelectOp = (Save,Same,Rsign,Usign);

bool = (tru,fls);

udtype=(up,down);

bitinteger = record
                case integer of
                    1:( bits: packed array [-ExStart..MANTSIZE] of 0..1 );
                    2:( int: integer)
                end;

Enables = ( (*      Literals to B bus       *)
                Pass3V, Pass2V, Pass4V, Pass3C, Pass2C, Pass1C,
                Lit24ToB, ZeroToB, LitToHitReg,
                Hit1, Hit2, Hit4, Hit8, Hit16, Hit32, (*      Miscellaneous     *)
                PushData, PopData,
                SetFirst, ClearFirst,
                SetHitBit, ClearHitBit,
                MoveAssert, DrawAssert, (*      I/O Enables       *)
                InputType,
                InputsToB, InLowToB,
                PassInToOut,
                CommandIn, CommandOut, DataInput, DataOutput,
                OutHigh, OutLow,
                CloseOutput
                );
```

```
Pokes = ( InLow, InHigh, SignC, SignM, CommReg, InType );

FlagType = ( HitTesting, NotHitTesting, FirstNotSent, FirstSent );

ChTypes = (Scaler, ScaleZ, ScaleXY, NotScaler, NotScaleZ,
           MM123, NotMM, MM, MM1, MM2, MM3, MM4,
           Even, Odd, Clip0, Clip1, Clip2, Clip3, Clip4, Clip5,
           Clip01, Clip23, Clip45, Clipper );

CommTypes = (
           Move, Draw, MoveDraw, DrawORDrawp, MoveORMovep,
           Point, Curve,
           ClosePoly, Poly, NotPoly,
           LoadVP,
           PopMatrix, PushMatrix, StoreMatrix, MultMatrix, LoadMatrix,
           PassThru, SetHitMode, ClearHitMode,
           EndCommand
           );

var
        OutReg, InputPins, HighReg, LowReg: -TWO16..TWO16M1;
        Bprecharge, FPinput, FPoutput, InReg: fpnum;

SPntrc, SPntrm: SelectOp;

InBuf: BufType;

Sp : -1..8;

A, U, S, D, R, B: register;

Stack: array [-1..8] of register;
        SignSaved: bitregister;
        FirstMoveBit, HitTestBit: 0..1;

(*  Command, Hit-test and Chip-type Internal registers.  *)
        CommandReg: 0..63;
        HitReg: 0..63;
        TypeReg: 0..7; Sbit, Cbit, Mbit: 0..1;

(*  Misc Program Variables for environment.  *)
        InToggle, OutToggle: boolean;
        thesign: boolean;
        VPint : 0..1;
        DrawFlag: boolean;
        MoveFlag: boolean;

(*    State instrumentation, statistics variables    *)
        StateTotal, StateCount, MaxCount, NumStarts: integer;

i,j,k:integer;
inputs
        signxc, signyc, signzc, signwc,
        signxm, signym, signzm, signwm,
        Nuxm, Nuym, Nuzm, Nuwm,
        Ndxm, Ndym, Ndzm, Ndwm,
        Zeroxm, Zeroym, Zerozm, Zerowm: bottom; (* complemented form *)
        Command[5:0],
        TypeReg[2:0], Sbit, Mbit, Cbit: bottom;
        First: bottom;

outputs
(* Characteristic PLA outputs *)
        Destxc[1:0], Destyc[1:0], Destzc[1:0], Destwc[1:0]: bottom ;
        Qsrcc[1:0]: bottom earlier(1);
        Psrcc: bottom earlier(1);
        RtoBx, RtoBy, RtoBz, RtoBw: bottom;   (* RtoB is inverted.  *)
        ALUc[3:0]: bottom earlier(1);
        PokeSignC: bottom;                              (* active low *)
        ZerotoB: bottom earlier(1);    (* active low *)

PushData: bottom;
        PopData: bottom earlier(1);
        SignSelect[1:0]: bottom earlier(1);
        PokeInRegister: bottom;                         (* active low *)
        InputsToB: bottom earlier(1);                   (* active low *)
        PokeInHigh,
        DataInput, DataOutput,
        CommandOut, SetFirst, ClearFirst: bottom;

(*
  Mantissa Outputs, also include 8 Next State bits and Push, pop and load
*)
        Destxm[1:0], Destym[1:0], Destzm[1:0], Destwm[1:0]: bottom;
```

```
        Qsrcm[1:0]: bottom earlier(1);
        Psrcm: bottom earlier(1);
        ALUm[3:0]: bottom earlier(1);
        ShiftUxm, ShiftUym, ShiftUzm, ShiftUwm: bottom;          (* active low *)
        ShiftDxm, ShiftDym, ShiftDzm, ShiftDwm: bottom;          (* active low *)
        PokeSignM: bottom;                      (* active low *)
        Literals[5..0];
         procedure Statistics;
         begin
         StateCount := StateCount + 1;
         end;
         procedure StateStart;
         begin
         if StateCount > MaxCount then MaxCount := StateCount;
         NumStarts := NumStarts + 1;
         StateTotal := StateTotal + StateCount;
         StateCount := 0;
         end;
         procedure StateEnd;
         begin
         writeln(tty," Max State Count:",MaxCount);
         writeln(tty," Average State Count:", StateTotal div NumStarts);
         end;

procedure doinit;
          begin
                Bprecharge.ch := -1; Bprecharge.ma := -1;

TypeReg := 0; Sbit := 0; Cbit := 0; Mbit := 0;
            NumStarts := -1; StateTotal := 0; MaxCount := 0;
            StateCount := 0;
            OutToggle := false;
            InToggle := false;
            Sp := 0;
            HitTestBit := 0;
            FirstMoveBit := 0;
            VPint := 0;
         DrawFlag := false;
         MoveFlag := false;
          end;

(******** environment definitions ********)

function CommType( c: CommTypes ): boolean;
definition
        (MoveDraw):     Command[4] ;
        (MoveORMoveP): Command[4] and not Command[1] and not Command[0];
        (DrawORDrawp): Command[4] and not Command[1] and     Command[0];
        (Point):        Command = PointCode;
        (Curve):        Command = CurveCode;

(LoadVP):       Command = LoadVPCode ;

(PushMatrix):  Command = PushMM;
        (PopMatrix):   Command = PopMM;
        (StoreMatrix): Command = StoreMM ;
        (LoadMatrix):  Command = LoadMM ;
        (MultMatrix):  Command = MultMM ;

(ClosePoly):   Command = CloseCode ;
        (Poly):                 Command[5] ;

(PassThru):    Command = PassThruCode;
        (SetHitMode):  Command = SetHitCode;
        (ClearHitMode):Command = ClearHitCode;
begin
case c of MoveDraw:       CommType := (CommandReg >= 16);
        MoveORMoveP:    CommType := (CommandReg = MoveCode)
                                 or (CommandReg = MovePCode);
        DrawORDrawp:    CommType := (CommandReg = DrawCode)
                                 or (CommandReg = DrawPCode);
        Point:          CommType := (CommandReg = PointCode);
        Curve:          CommType := (CommandReg = CurveCode);
        ClosePoly:      CommType := (CommandReg = CloseCode);
        Poly:           CommType := (CommandReg >= 32);
        NotPoly:        CommType := (CommandReg < 32);

LoadVP:         CommType := (CommandReg = LoadVPCode);

PushMatrix:     CommType := (CommandReg = PushMM);
        PopMatrix:      CommType := (CommandReg = PopMM);
        LoadMatrix:     CommType := (CommandReg = LoadMM);
        StoreMatrix:    CommType := (CommandReg = StoreMM);
        MultMatrix:     CommType := (CommandReg = MultMM);
```

```
        PassThru:        CommType := (CommandReg = PassThruCode);

SetHitMode:      CommType := (CommandReg = SetHitCode);
        ClearHitMode:    CommType := (CommandReg = ClearHitCode);

EndCommand:      CommType := (CommandReg = EndCode);
        end
end;

function ChipType( c: ChTypes ): boolean;
definition
        (Scaler):        Sbit;
        (NotScaler):     not Sbit;
        (MM):            Mbit;
        (Clipper):       Cbit;
        (ScaleZ):        TypeReg = ScalezCode and Sbit;
        (NotScaleZ):     not TypeReg[0];
        (ScaleXY):       TypeReg = ScalexyCode and Sbit;
        (MM123):         Mbit and not TypeReg[2];
        (NotMM):         not Mbit;

(Even):                  not TypeReg[0];
        (Odd):           TypeReg[0];
        (Clip01):        not TypeReg[2] and not TypeReg[1] and Cbit;
        (Clip23):        not TypeReg[2] and TypeReg[1] and Cbit;
        (Clip45):        TypeReg[2] and not TypeReg[1] and Cbit;
        (clip0):         TypeReg = 0 and Cbit;
        (clip1):         TypeReg = 1 and Cbit;
        (clip2):         TypeReg = 2 and Cbit;
        (clip3):         TypeReg = 3 and Cbit;
        (clip4):         TypeReg = 4 and Cbit;
        (clip5):         TypeReg = 5 and Cbit;

(MM1):           Mbit and TypeReg = mm1Code;
        (MM2):           Mbit and TypeReg = mm2Code;
        (MM3):           Mbit and TypeReg = mm3Code;
        (MM4):           Mbit and TypeReg = mm4Code;
begin
    case c of
        Scaler:           ChipType := (Sbit = 1);
        Clipper:          ChipType := (Cbit = 1);
        MM:               ChipType := (Mbit = 1);
        ScaleZ:           ChipType := (Sbit = 1) and (TypeReg = ScalezCode);
        NotScaleZ:        ChipType := (TypeReg <> ScaleZcode);
        ScaleXY:          ChipType := (Sbit = 1) and (TypeReg = ScalexyCode);
        NotScaler:        ChipType := (Sbit = 0);
        MM123: ChipType := (Mbit = 1) and (TypeReg < 4);
        NotMM: ChipType := (Mbit = 0);
        Even:             ChipType := ((TypeReg mod 2) = 0);
        Odd:              ChipType := ((TypeReg mod 2) = 1);
        Clip01:           ChipType := ((TypeReg div 2) = 0) and (Cbit = 1);
        Clip23:           ChipType := ((TypeReg div 2) = 1) and (Cbit = 1);
        Clip45:           ChipType := ((TypeReg div 2) = 2) and (Cbit = 1);
        Clip0: ChipType := (Cbit = 1) and (TypeReg = Clip0Code);
        Clip1: ChipType := (Cbit = 1) and (TypeReg = Clip1Code);
        Clip2: ChipType := (Cbit = 1) and (TypeReg = Clip2Code);
        Clip3: ChipType := (Cbit = 1) and (TypeReg = Clip3Code);
        Clip4: ChipType := (Cbit = 1) and (TypeReg = Clip4Code);
        Clip5: ChipType := (Cbit = 1) and (TypeReg = Clip5Code);

MM4:   ChipType := (Mbit = 1) and (TypeReg = mm4Code);
        MM1:   ChipType := (Mbit = 1) and (TypeReg = mm1Code);
        MM2:   ChipType := (Mbit = 1) and (TypeReg = mm2Code);
        MM3:   ChipType := (Mbit = 1) and (TypeReg = mm3Code);
        others: writeln(tty,' Unused Chip-Type: error.');
    end
end;

function Flags( v: flagtype ): boolean;
definition
        (HitTesting): HitTesting;
        (FirstNotSent): FirstMove;
        (NotHitTesting): not HitTesting;
        (FirstSent): not FirstMove;
begin
case v of
    HitTesting:      Flags := (HitTestBit = 1);
    NotHitTesting:   Flags := (HitTestBit = 0);
    FirstNotSent:    Flags := (FirstMoveBit = 1);
    FirstSent:       Flags := (FirstMoveBit = 0);
end;
end;

procedure PutToB(a:integer);
```

```
begin
   b.xc.ch := a;
   b.yc.ch := a;
   b.zc.ch := a;
   b.wc.ch := a;
end;

procedure Poke( v:Pokes );
definitions
        Poke&v;
begin
        case v of
                InType:
                    begin
                    i := InputPins;
                    Sbit := BitExtract(i, 30, 1 );
                    Cbit := BitExtract(I, 31, 1 );
                    Mbit := BitExtract(I, 32, 1 );
                    TypeReg := BitExtract(I, 33, 3 );
                    end;
                InHigh:
                        HighReg := InputPins;
                InLow:
                        LowReg := InputPins;
                CommReg:
                    begin
                    i := InputPins;
                    HitReg := BitExtract(i, 22, 6 );
                    CommandReg := BitExtract( I, 30, 6 );
                    end;
                SignC:
                    begin
                        SignSaved.xc.ch := (R.xc.ch<0);
                        SignSaved.yc.ch := (R.yc.ch<0);
                        SignSaved.zc.ch := (R.zc.ch<0);
                        SignSaved.wc.ch := (R.wc.ch<0);
                    end;
                SignM:
                    begin
                        SignSaved.xc.ma := (R.xc.ma<0);
                        SignSaved.yc.ma := (R.yc.ma<0);
                        SignSaved.zc.ma := (R.zc.ma<0);
                        SignSaved.wc.ma := (R.wc.ma<0);
                    end
         end;
end;

procedure Enable( v: Enables );
definition (PushData):      PushData;
        (PopData):       PopData;
        (MoveAssert):    MoveAssert;
        (DrawAssert):    DrawAssert;

(DataOutput):    DataOutput;
        (DataInput):     DataInput;
        (PassInToOut):   DataInput; InputsToB; OutLow; DataOutput;
        (CommandOut):    DataOutput; CommRegToB; OutHigh;

(OutLow):        OutLow;
        (OutHigh):       OutHigh;

(InputsToB):     InputsToB;
        (InLowToB):      InLowToB;

(Pass4V):        Literals = 31; LiteralToB;
        (Pass3V):        Literals = 23; LiteralToB;
        (Pass2V):        Literals = 15; LiteralToB;
        (Pass3C):        Literals = 5; LiteralToB;
        (Pass2C):        Literals = 3; LiteralToB;
        (Pass1C):        Literals = 1; LiteralToB;
        (Lit24Tob):      Literals = 24; LiteralToB;

(Hit1):          Literals = 1; LitToHitReg;
        (Hit2):          Literals = 2; LitToHitReg;
        (Hit4):          Literals = 4; LitToHitReg;
        (Hit8):          Literals = 8; LitToHitReg;
        (Hit16):         Literals = 16; LitToHitReg;
        (Hit32):         Literals = 32; LitToHitReg;

(SetHitBit):     Literals = 1; PokeHitBit;
        (ClearHitBit):   Literals = 0; PokeHitBit;
        (SetFirst):      Literals = 1; PokeFirstMove;
        (ClearFirst):    Literals = 0; PokeFirstMove;
```

```
var foo:integer;   x:real;
begin
case v of
        SetFirst: FirstMoveBit := 1;
        ClearFirst: FirstMoveBit := 0;
        SetHitBit:  HitTestBit := 1;
        ClearHitBit:   HitTestBit := 0;

CloseOutput: Write(output,EndCode);

Hit1: begin i := HitReg; BitIn(i,1,b0,1); HitReg :=i end;
        Hit2: begin i := HitReg; BitIn(i,1,b1,1); HitReg :=i end;
        Hit4: begin i := HitReg; BitIn(i,1,b2,1); HitReg :=i end;
        Hit8: begin i := HitReg; BitIn(i,1,b3,1); HitReg :=i end;
        Hit16: begin i := HitReg; BitIn(i,1,b4,1); HitReg :=i end;
        Hit32: begin i := HitReg; BitIn(i,1,b5,1); HitReg :=i end;

Lit24toB: PutToB(24);
        Pass4V: PutToB(31);
        Pass3V: PutToB(23);
        Pass2V: PutToB(15);
        Pass3C: PutToB(5);
        Pass2C: PutToB(3);
        Pass1C: PutToB(1);
        ZerotoB:
          begin
           PutToB(0);
           B.xc.ma := 0;   B.yc.ma := 0;   B.zc.ma := 0;   B.wc.ma := 0;
          end;
        PushData:
                begin
                Sp := Sp+1;
                Stack[Sp] := R;
                S := Stack[Sp];
                end;
        PopData:
                begin
                Sp := Sp-1;
                S := Stack[Sp];
                end;

PassInToOut:
            begin
(*              writeln(tty,"Enable(passInToOut)."); break(tty);*)
                Enable(DataInput);
                Enable(InputsToB);
                Enable(OutLow)  ;
            end;
        DataOutput:
          begin
(*          writeln(tty,"Dataoutput:");break(tty);*)
            writeln(output,OutReg);
          end;
        InputstoB:
                begin
                    (* Input from HighReg and InputPins  *)
                    k := 0;
(*                  writeln(tty,"Enable(inputstob)"); break(tty);*)
                    j := HighReg;
(*                  writeln(tty,"HighReg=",HighReg:6:o);*)
                    i := BitExtract( j, 20, 8 );
(*                  writeln(tty,"i=",i:6:o);break(tty);*)
                    BitInExtend( k, i, 28, 8 );
                            InReg.ch := k;
                    k := 0;
                    i := BitExtract( j, 28, 8 );
                    BitInExtend( k, i, 12, 8 );
                    i := InputPins;
                    BitIn( k, i, 20, 16 );
                    InReg.ma := k;

(*                  writeln(tty,"Inreg =", Inreg.ch, Inreg.ma );break(tty);*)

B.xc := InReg ;B.yc := InReg; B.zc := InReg; B.wc := InReg
                end;
        InLowToB:
           begin  (* Low bits to b bus *)
            InReg.ch := -1;
            k := -1;
            i := LowReg;
            BitIn( k, i, 20, 16);
            InReg.ma := k;

B.xc := InReg ;B.yc := InReg; B.zc := InReg; B.wc := InReg
           end;
```

```
            DataInput:
            begin
(*          writeln(tty,' DataInput:'); break(tty);*)
                read(input, InputPins);
            end;
            OutHigh:
                begin
                i := B.wc.ch;
                BitInExtend( k, i, 20, 8 );
                j := B.wc.ma;
                i := BitExtract( j, 12, 8);
                BitIn( k, i, 28, 8 );
                OutReg := k;
                Enable(DataOutput)
                end;
            OutLow:
                begin
                i := B.wc.ma;
                k := 0;
                BitInExtend( k, i, 20, 16);
                OutReg := k;
                Enable(DataOutput);
                end;
            CommandIn:
                begin
(*              writeln(tty,'Command Input:');break(tty);*)
                Enable(DataInput);
                Poke(CommReg);
                end;
            MoveAssert: MoveFlag := true;
            DrawAssert: DrawFlag := true;
            CommandOut:
                begin
                k := 0;
                i := HitReg;
                BitIn( k, i, 22, 6);
                i := CommandReg;
                BitIn( k, i, 3C, 6);
                if MoveFlag then
                    begin
                    BitIn( k, 0, 34, 1);
                    BitIn( k, C, 35, 1);
                    MoveFlag := false;
                    end;
                if DrawFlag then
                    begin
                    BitIn( k, 0, 34, 1);
                    DrawFlag := false;
                    end;
                OutReg := k;
(*              writeln(tty,'CommandOut:');break(tty);*)
                Enable(DataOutput);
                end;
            end
end;

function Zero( pp:component; v:bool ): boolean;
definitions
        (?,tru): Zero&pp&m;
        (?,fls): not Zero&pp&m;
var ZeroVal: boolean;
begin
case pp of
        x: ZeroVal := (U.xc.ma = 0);
        y: ZeroVal := (U.yc.ma = 0);
        z: ZeroVal := (U.zc.ma = 0);
        w: ZeroVal := (U.wc.ma = 0)
end;
if v=fls then Zero := not ZeroVal else Zero := ZeroVal;
end;

procedure Select( v: SelectOp; qq:part );
definition
        (Save,?):       SignSelect&qq = 0;
        (Same,?):       SignSelect&qq = 1;
        (Rsign,?):      SignSelect&qq = 2;
        (Usign,?):      SignSelect&qq = 3;
begin
case qq of
        m: SPntrm := v;
        c: SPntrc := v
        end
end;
```

```
procedure Shift( ud: udtype; pp:component );
definitions
        (down,?): Shift&pp&m;
        (up,?): Shift&U&pp&m;

procedure shiftup(var mant:integer);
                var foo:bitinteger; i:integer;
        begin
        foo.int := mant;
        for i := 0 to MANTSIZE-1 do foo.bits[i] := foo.bits[i+1];
        for i := -ExStart to -1 do foo.bits[i] := foo.bits[0];
        foo.bits[MANTSIZE] := 0;
        mant := foo.int
        end;

procedure shiftdown( var mant:integer );
                var foo:bitinteger; i:integer;
        begin
        foo.int := mant;
        for i := MANTSIZE downto -(ExStart-1)
                do foo.bits[i] := foo.bits[i-1];
        mant := foo.int
        end;
begin
        case ud of
                up: case pp of
                        x: shiftup(U.xc.ma);
                        y: shiftup(U.yc.ma);
                        z: shiftup(U.zc.ma);
                        w: shiftup(U.wc.ma);
                        all:
                                begin
                                shiftup(U.xc.ma);
                                shiftup(U.yc.ma);
                                shiftup(U.zc.ma);
                                shiftup(U.wc.ma);
                                end
                        end;
                down: case pp of
                        x: shiftdown(D.xc.ma);
                        y: shiftdown(D.yc.ma);
                        z: shiftdown(D.zc.ma);
                        w: shiftdown(D.wc.ma);
                        all:
                                begin
                                shiftdown(D.xc.ma);
                                shiftdown(D.yc.ma);
                                shiftdown(D.zc.ma);
                                shiftdown(D.wc.ma);
                                end
                        end
                end
end;

procedure RtoB( v:component );
definitions
        RtoB&v;
var foo: fpnum;
begin
        case v of
                x: begin foo.ch := R.xc.ch; foo.ma := R.xc.ma end;
                y: begin foo.ch := R.yc.ch; foo.ma := R.yc.ma end;
                z: begin foo.ch := R.zc.ch; foo.ma := R.zc.ma end;
                w: begin foo.ch := R.wc.ch; foo.ma := R.wc.ma end
                end;
B.xc.ch := foo.ch; B.xc.ma := foo.ma;
B.yc.ch := foo.ch; B.yc.ma := foo.ma;
B.zc.ch := foo.ch; B.zc.ma := foo.ma;
B.wc.ch := foo.ch; B.wc.ma := foo.ma;
end;

function NMSB(X:integer): boolean;
var     foo: bitinteger; (* variant record type *)
begin
foo.int := X;
NMSB := (foo.bits[1] = 1);
end;
function NNMSB(X:integer): boolean;
var     foo: bitinteger;
begin
foo.int := X;
NNMSB := (foo.bits[2] = 1);
end;
function MSB(X:integer): boolean;
var     foo: bitinteger;
begin
```

```
foo.int := X;
MSB := (foo.bits[0] = 1);
end;

function Norm( ud:udtype; pp:component ): boolean;
definitions
        (up,?): Nu&pp&m;
        (down,?): Nd&pp&m;
var     a,b,c: boolean;
begin
case ud of
        down:
                case pp of
                        x: begin  a := MSB(U.xc.ma); b := NMSB(U.xc.ma);
                                Norm := (not a and b) or (a and not b) end;
                        y: begin  a := MSB(U.yc.ma); b := NMSB(U.yc.ma);
                                Norm := (not a and b) or (a and not b) end;
                        z: begin  a := MSB(U.zc.ma); b := NMSB(U.zc.ma);
                                Norm := (not a and b) or (a and not b) end;
                        w: begin  a := MSB(U.wc.ma); b := NMSB(U.wc.ma);
                                Norm := (not a and b) or (a and not b) end
                end;
        up:
                case pp of
                        x: begin
                                a := MSB(U.xc.ma); b := NMSB(U.xc.ma); c := NNMSB(U.xc.ma);
                                Norm := (a and b and c) or (not a and not b and not c);
                                end;
                        y: begin
                                a := MSB(U.yc.ma); b := NMSB(U.yc.ma); c := NNMSB(U.yc.ma);
                                Norm := (a and b and c) or (not a and not b and not c);
                                end;
                        z: begin
                                a := MSB(U.zc.ma); b := NMSB(U.zc.ma); c := NNMSB(U.zc.ma);
                                Norm := (a and b and c) or (not a and not b and not c);
                                end;
                        w: begin
                                a := MSB(U.wc.ma); b := NMSB(U.wc.ma); c := NNMSB(U.wc.ma);
                                Norm := (a and b and c) or (not a and not b and not c);
                                end
                end
end end;

procedure Load( var Reg:register; pp:component; qq:part );
definition
        (U,?,?): Dest&pp&qq = LoadU;
        (D,?,?): Dest&pp&qq = LoadD;
        (A,?,?): Dest&pp&qq = LoadA;
begin
case pp of
x: case qq of
        both:begin  Reg.xc.ch := R.xc.ch; Reg.xc.ma := R.xc.ma end;
        m: Reg.xc.ma := R.xc.ma;
        c: Reg.xc.ch := R.xc.ch;
        others:begin writeln( "part description illegal: ", qq); end
   end;
y: case qq of
        both:begin  Reg.yc.ch := R.yc.ch; Reg.yc.ma := R.yc.ma end;
        m: Reg.yc.ma := R.yc.ma;
        c: Reg.yc.ch := R.yc.ch;
        others:begin writeln( "part description illegal: ", qq); break(output) end
   end;
z: case qq of
        both:begin  Reg.zc.ch := R.zc.ch; Reg.zc.ma := R.zc.ma end;
        m: Reg.zc.ma := R.zc.ma;
        c: Reg.zc.ch := R.zc.ch;
        others:begin writeln( "part description illegal: ", qq); break(output) end
   end;
w: case qq of
        both:begin  Reg.wc.ch := R.wc.ch; Reg.wc.ma := R.wc.ma end;
        m: Reg.wc.ma := R.wc.ma;
        c: Reg.wc.ch := R.wc.ch;
        others:begin writeln( "part description illegal: ", qq); break(output) end
   end;
all: case qq of
        both:
                begin
                Reg.xc.ch := R.xc.ch; Reg.xc.ma := R.xc.ma;
```

```
                    Reg.yc.ch := R.yc.ch; Reg.yc.ma := R.yc.ma;
                    Reg.zc.ch := R.zc.ch; Reg.zc.ma := R.zc.ma;
                    Reg.wc.ch := R.wc.ch; Reg.wc.ma := R.wc.ma
                    end;
           m:
                    begin
                    Reg.xc.ma := R.xc.ma;
                    Reg.yc.ma := R.yc.ma;
                    Reg.zc.ma := R.zc.ma;
                    Reg.wc.ma := R.wc.ma
                    end;
           c:
                    begin
                    Reg.xc.ch := R.xc.ch;
                    Reg.yc.ch := R.yc.ch;
                    Reg.zc.ch := R.zc.ch;
                    Reg.wc.ch := R.wc.ch
                    end;
           others: writeln( 'part description illegal: ', qq)
           end;
others: writeln(' component description illegal:', pp )
end
end;

function Sign( pp: component; qq: part; polarity: bool ): boolean;
definition
        (?,?,tru):       sign&pp&qq;
        (?,?,fls):       not sign&pp&qq;
var Stmp: SelectOp;
begin
if qq = c then Stmp := SPntrc else Stmp := SPntrm;
case Stmp of
Same: case pp of
       x: case qq of
                  m: thesign := ((R.xc.ma<0) and SignSaved.xc.ma)
                          or ( not(R.xc.ma<0) and not SignSaved.xc.ma );
                  c: thesign := ( (R.xc.ch<0) and SignSaved.xc.ch)
                          or (not (R.xc.ch<0) and not SignSaved.xc.ch )
                  end;
       y: case qq of
                  m: thesign := ( (R.yc.ma<0) and SignSaved.yc.ma)
                          or (not (R.yc.ma<0) and not SignSaved.yc.ma);
                  c: thesign := ( (R.yc.ch<0) and SignSaved.yc.ch )
                          or ( not (R.yc.ch<0) and not SignSaved.yc.ch )
                  end;
       z: case qq of
                  m: thesign := ( (R.zc.ma<0) and SignSaved.zc.ma )
                          or ( not (R.zc.ma<0) and not SignSaved.zc.ma );
                  c: thesign := ( (R.zc.ch<0) and SignSaved.zc.ch )
                          or ( not (R.zc.ch<0) and not SignSaved.zc.ch )
                  end;
       w: case qq of
                  m: thesign := ( (R.wc.ma<0) and SignSaved.wc.ma )
                          or ( not(R.wc.ma<0) and not SignSaved.wc.ma );
                  c: thesign :=  ( (R.wc.ch<0) and SignSaved.wc.ch )
                          or ( not(R.wc.ch<0) and not SignSaved.wc.ch )
                  end
       end;
Rsign: case pp of
       x: case qq of
                  m: thesign := (R.xc.ma<0);
                  c: thesign := (R.xc.ch<0)
                  end;
       y: case qq of
                  m: thesign := (R.yc.ma<0);
                  c: thesign := (R.yc.ch<0)
                  end;
       z: case qq of
                  m: thesign := (R.zc.ma<0);
                  c: thesign := (R.zc.ch<0)
                  end;
       w: case qq of
                  m: thesign := (R.wc.ma<0);
                  c: thesign := (R.wc.ch<0)
                  end
       end;
Save: case pp of
       x: case qq of
                  m: thesign := SignSaved.xc.ma;
                  c: thesign := SignSaved.xc.ch
                  end;
       y: case qq of
                  m: thesign := SignSaved.yc.ma;
```

```
                        c: thesign := SignSaved.yc.ch
                           end;
                z: case qq of
                        m: thesign := SignSaved.zc.ma;
                        c: thesign := SignSaved.zc.ch
                           end;
                w: case qq of
                        m: thesign := SignSaved.wc.ma;
                        c: thesign := SignSaved.wc.ch
                           end
             end;
Usign: case pp of
        x: case qq of
                m: thesign := (U.xc.ma<0);
                c: thesign := (U.xc.ch<0)
                   end;
        y: case qq of
                m: thesign := (U.yc.ma<0);
                c: thesign := (U.yc.ch<0)
                   end;
        z: case qq of
                m: thesign := (U.zc.ma<0);
                c: thesign := (U.zc.ch<0)
                   end;
        w: case qq of
                m: thesign := (U.wc.ma<0);
                c: thesign := (U.wc.ch<0)
                   end
           end
end;
if polarity=fls then  Sign := not thesign else Sign := thesign
end;

procedure MinusQ( X: register;  qq: part );
definition
        ALU&qq= MinusQop;
        (B,?):  Qsrc&qq= BtoQ;
        (S,?):  Qsrc&qq= StoQ;
        (D,?):  Qsrc&qq= DtoQ;
begin
case qq of
        both:
                begin
                        R.xc.ma := -X.xc.ma; R.yc.ma := -X.yc.ma;
                                R.zc.ma := -X.zc.ma;
                                R.wc.ma := -X.wc.ma;
                        R.xc.ch := -X.xc.ch; R.yc.ch := -X.yc.ch; R.zc.ch := -X.zc.ch;
                                R.wc.ch := -X.wc.ch;
                end;
        c:
                begin
                R.xc.ch := -X.xc.ch; R.yc.ch := -X.yc.ch; R.zc.ch := -X.zc.ch;
                        R.wc.ch := -X.wc.ch;
                end;
        m:
                begin
                R.xc.ma := -X.xc.ma; R.yc.ma := -X.yc.ma; R.zc.ma := -X.zc.ma;
                        R.wc.ma := -X.wc.ma;
                end;
        others: writeln(' illegal part desctiption:' ,qq )
        end
end;

procedure PassQ( X: register;  qq: part );
definition
        ALU&qq= PassQop;
        (B,?):  Qsrc&qq= BtoQ;
        (S,?):  Qsrc&qq= StoQ;
        (D,?):  Qsrc&qq= DtoQ;
begin
case qq of
        both:
                begin
                        R.xc.ma := X.xc.ma; R.yc.ma := X.yc.ma; R.zc.ma := X.zc.ma;
                                R.wc.ma := X.wc.ma;
                        R.xc.ch := X.xc.ch; R.yc.ch := X.yc.ch; R.zc.ch := X.zc.ch;
                                R.wc.ch := X.wc.ch;
                end;
        c:
                begin
                R.xc.ch := X.xc.ch; R.yc.ch := X.yc.ch; R.zc.ch := X.zc.ch;
                        R.wc.ch := X.wc.ch;
                end;
        m:
                begin
```

```
                R.xc.ma := X.xc.ma; R.yc.ma := X.yc.ma; R.zc.ma := X.zc.ma;
                        R.wc.ma := X.wc.ma;
                end;
        others: writeln(' illegal part desctiption:' ,qq )
        end
end;

procedure MinusP( X: register;   qq: part );
definition
        ALU&qq= MinusPop;
        (U,?):  Psrc&qq;
begin
case qq of
        both:
                begin
                        R.xc.ma := -X.xc.ma; R.yc.ma := -X.yc.ma; R.zc.ma := -X.zc.ma;
                                R.wc.ma := -X.wc.ma;
                        R.xc.ch := -X.xc.ch; R.yc.ch := -X.yc.ch; R.zc.ch := -X.zc.ch;
                                R.wc.ch := -X.wc.ch;
                end;
        c:
                begin
                R.xc.ch := -X.xc.ch; R.yc.ch := -X.yc.ch; R.zc.ch := -X.zc.ch;
                        R.wc.ch := -X.wc.ch;
                end;
        m:
                begin
                R.xc.ma := -X.xc.ma; R.yc.ma := -X.yc.ma; R.zc.ma := -X.zc.ma;
                        R.wc.ma := -X.wc.ma;
                end;
        others: writeln(' illegal part desctiption:' ,qq )
        end
end;

procedure PassP(X: register;   qq: part );
definition
        ALU&qq=  PassPop;
        (U,?):   Psrc&qq;
begin
case qq of
        both:
                begin
                        R.xc.ma := X.xc.ma; R.yc.ma := X.yc.ma; R.zc.ma := X.zc.ma;
                                R.wc.ma := X.wc.ma;
                        R.xc.ch := X.xc.ch; R.yc.ch := X.yc.ch; R.zc.ch := X.zc.ch;
                                R.wc.ch := X.wc.ch;
                end;
        c:
                begin
                R.xc.ch := X.xc.ch; R.yc.ch := Y.yc.ch; R.zc.ch := X.zc.ch;
                        R.wc.ch := X.wc.ch;
                end;
        m:
                begin
                R.xc.ma := X.xc.ma; R.yc.ma := X.yc.ma; R.zc.ma := X.zc.ma;
                        R.wc.ma := X.wc.ma;
                end;
        others: writeln(' illegal part desctiption:' ,qq )
        end
end;

procedure PminusQ( P, Q: register; qq:part );
definition
                ALU&qq= PminusQop;
        (?,B,?): Qsrc&qq= BtoQ;
        (?,D,?): Qsrc&qq= DtoQ;
        (?,S,?): Qsrc&qq= StoQ;
        (U,?,?): Psrc&qq;
begin
case qq of
        both:
                begin
                R.xc.ch := P.xc.ch - Q.xc.ch;
                R.yc.ch := P.yc.ch - Q.yc.ch;
                R.zc.ch := P.zc.ch - Q.zc.ch;
                R.wc.ch := P.wc.ch - Q.wc.ch;
                R.xc.ma := P.xc.ma - Q.xc.ma;
                R.yc.ma := P.yc.ma - Q.yc.ma;
                R.zc.ma := P.zc.ma - Q.zc.ma;
                R.wc.ma := P.wc.ma - Q.wc.ma;
                end;
        c:
                begin
                R.xc.ch := P.xc.ch - Q.xc.ch;
                R.yc.ch := P.yc.ch - Q.yc.ch;
```

```
                    R.zc.ch := P.zc.ch - Q.zc.ch;
                    R.wc.ch := P.wc.ch - Q.wc.ch;
                    end;
            m:
                    begin
                    R.xc.ma := P.xc.ma - Q.xc.ma;
                    R.yc.ma := P.yc.ma - Q.yc.ma;
                    R.zc.ma := P.zc.ma - Q.zc.ma;
                    R.wc.ma := P.wc.ma - Q.wc.ma;
                    end;
            others: writeln(' illegal part desctiption:', qq )
            end
end;

procedure MinusPplusQ( P, Q: register;  qq:part );
definition
                ALU&qq= MPpQop;
        (?,B,?): Qsrc&qq= BtoQ;
        (?,D,?): Qsrc&qq= DtoQ;
        (?,S,?): Qsrc&qq= StoQ;
        (U,?,?): Psrc&qq;
begin
case qq of
        both:
                    begin
                    R.xc.ch := -P.xc.ch + Q.xc.ch;
                    R.yc.ch := -P.yc.ch + Q.yc.ch;
                    R.zc.ch := -P.zc.ch + Q.zc.ch;
                    R.wc.ch := -P.wc.ch + Q.wc.ch;
                    R.xc.ma := -P.xc.ma + Q.xc.ma;
                    R.yc.ma := -P.yc.ma + Q.yc.ma;
                    R.zc.ma := -P.zc.ma + Q.zc.ma;
                    R.wc.ma := -P.wc.ma + Q.wc.ma;
                    end;
            c:
                    begin
                    R.xc.ch := -P.xc.ch + Q.xc.ch;
                    R.yc.ch := -P.yc.ch + Q.yc.ch;
                    R.zc.ch := -P.zc.ch + Q.zc.ch;
                    R.wc.ch := -P.wc.ch + Q.wc.ch;
                    end;
            m:
                    begin
                    R.xc.ma := -P.xc.ma + Q.xc.ma;
                    R.yc.ma := -P.yc.ma + Q.yc.ma;
                    R.zc.ma := -P.zc.ma + Q.zc.ma;
                    R.wc.ma := -P.wc.ma + Q.wc.ma;
                    end;
            others: writeln(' illegal part desctiption:',qq )
            end
end;

procedure PplusQ( P, Q: register; qq:part );
definition
                ALU&qq= PplusQop;
        (?,B,?): Qsrc&qq= BtoQ;
        (?,D,?): Qsrc&qq= DtoQ;
        (?,S,?): Qsrc&qq= StoQ;
        (U,?,?): Psrc&qq;
begin
case qq of
        both:
                    begin
                    R.xc.ch := P.xc.ch + Q.xc.ch;
                    R.yc.ch := P.yc.ch + Q.yc.ch;
                    R.zc.ch := P.zc.ch + Q.zc.ch;
                    R.wc.ch := P.wc.ch + Q.wc.ch;
                    R.xc.ma := P.xc.ma + Q.xc.ma;
                    R.yc.ma := P.yc.ma + Q.yc.ma;
                    R.zc.ma := P.zc.ma + Q.zc.ma;
                    R.wc.ma := P.wc.ma + Q.wc.ma;
                    end;
            c:
                    begin
                    R.xc.ch := P.xc.ch + Q.xc.ch;
                    R.yc.ch := P.yc.ch + Q.yc.ch;
                    R.zc.ch := P.zc.ch + Q.zc.ch;
                    R.wc.ch := P.wc.ch + Q.wc.ch;
                    end;
            m:
                    begin
                    R.xc.ma := P.xc.ma + Q.xc.ma;
                    R.yc.ma := P.yc.ma + Q.yc.ma;
                    R.zc.ma := P.zc.ma + Q.zc.ma;
```

```
                    R.wc.ma := P.wc.ma + O.wc.ma;
                    end;
        others: writeln(" illegal part desctiption:" ,qq )
        end
end;

procedure Pplus1( P: register; qq:part );
definition
                ALU&qq= Pplus1op;
        (U,?,?): Psrc&qq;
begin
case qq of
        both:
                begin
                R.xc.ch := P.xc.ch + 1;
                R.yc.ch := P.yc.ch + 1;
                R.zc.ch := P.zc.ch + 1;
                R.wc.ch := P.wc.ch + 1;
                R.xc.ma := P.xc.ma + 1;
                R.yc.ma := P.yc.ma + 1;
                R.zc.ma := P.zc.ma + 1;
                R.wc.ma := P.wc.ma + 1;
                end;
        c:
                begin
                R.xc.ch := P.xc.ch + 1;
                R.yc.ch := P.yc.ch + 1;
                R.zc.ch := P.zc.ch + 1;
                R.wc.ch := P.wc.ch + 1;
                end;
        m:
                begin
                R.xc.ma := P.xc.ma + 1;
                R.yc.ma := P.yc.ma + 1;
                R.zc.ma := P.zc.ma + 1;
                R.wc.ma := P.wc.ma + 1;
                end;
        others: writeln(" illegal part:",qq  )
        end
end;

procedure Pminus1( P: register; qq:part );
definition
                ALU&qq= Pminus1op;
        (U,?): Psrc&qq;
begin
case qq of
        both:
                begin
                R.xc.ch := P.xc.ch - 1;
                R.yc.ch := P.yc.ch - 1;
                R.zc.ch := P.zc.ch - 1;
                R.wc.ch := P.wc.ch - 1;
                R.xc.ma := P.xc.ma - 1;
                R.yc.ma := P.yc.ma - 1;
                R.zc.ma := P.zc.ma - 1;
                R.wc.ma := P.wc.ma - 1;
                end;
        c:
                begin
                R.xc.ch := P.xc.ch - 1;
                R.yc.ch := P.yc.ch - 1;
                R.zc.ch := P.zc.ch - 1;
                R.wc.ch := P.wc.ch - 1;
                end;
        m:
                begin
                R.xc.ma := P.xc.ma - 1;
                R.yc.ma := P.yc.ma - 1;
                R.zc.ma := P.zc.ma - 1;
                R.wc.ma := P.wc.ma - 1;
                end;
        others: writeln(" illegal part:",qq  )
        end
end;
procedure writeError;
begin
write(output," Command not recognized in " );
if Sbit=1 then writeln(output," Scaler",TypeReg)
else if Mbit=1 then writeln(output," MM",TypeReg)
else if Cbit=1 then writeln(output," Clipper",TypeReg)
else writeln(" No Chip Type.");
writeln(output,"          CommandReg = ",CommandReg);
end;
```

```
procedure VPMode( x: integer );
begin
VPint := x;
end;
```

MICRO CODE DEFINITION

```
     fsm
1. [ Statistics ] (*   Input Chip-type and forward remainder of Chip-types   *)  ⎫
2. [ doinit; Enable(DataInput); Poke(InType); Poke(InHigh) ]                     ⎬ A
3. [ Enable(InputsToB); Call PassN ]                                             ⎭
     Start:
1. [ StateStart; Enable(CommandIn); Poke(InHigh) ]                               ⎫
2. [        if CommType(PassThru) => next PASSTHRU;                              ⎪
            if CommType(LoadVP) => next LoadVP;                                  ⎪
            if CommType(PopMatrix) => next POPMATRIX;                            ⎪
            if CommType(PushMatrix) => next PUSHMATRIX;                          ⎪
            if CommType(LoadMatrix) => next LOADMATRIX;                          ⎪
            if CommType(StoreMatrix) => next STOREMATRIX;                        ⎪
            if CommType(MultMatrix) => next MULTMATRIX;                          ⎬ B
            if CommType(MoveDraw) and ChipType(MM) => next MOVEDRAWMM;           ⎪
            if CommType(MoveDraw) and ChipType(Clipper) => next CLIPPER;         ⎪
            if CommType(MoveDraw) and ChipType(Scaler) => next SCALE;            ⎪
            if CommType(EndCommand) => next TheEnd;                              ⎪
            if CommType(SetHitMode) =>                                           ⎪
                    [ Enable(SetHitBit); Enable(CommandOut); next start ];       ⎪
            if CommType(ClearHitMode) =>                                         ⎪
                    [ Enable(ClearHitBit); Enable(CommandOut); next start ] ]    ⎭
3. [ writeError; next Start ]

PASSTHRU:
1. [ if ChipType(NotScaler) => Enable(CommandOut);                               ⎫
     if ChipType(ScaleZ) => Enable(CommandOut) ]                                 ⎪
2. [ Enable(InputsToB); call PassN ]                                             ⎬ C
3.              [ next Start ]                                                   ⎪
     PassN:                                                                      ⎪
4. [ PassC(B,c); Load(A,w,c); Select(Rsign,c);                                   ⎪
            if Sign(w,c,tru) => return ]                                         ⎪
     LoopIt:                                                                     ⎪
5. [ Pminus1(A,c); Load(A,w,c); Select(Rsign,c); Enable(PassInToOut);            ⎪
            if Sign(w,c,tru) => return;                                          ⎪
            if Sign(w,c,fls) => next LoopIt ]                                    ⎭
(******* Scaler Load, Move and Draw Commands *******)

LOADVP:
[ if Flags(NotHitTesting) => next DoLoadVP ]                                     ⎫
[ call InputVector ]                                                             ⎪
[ call InputVector ]                                                             ⎪
[ next Start ]                                                                   ⎪
DoLoadVP:                                                                        ⎪
[ Enable(CommandOut); call InOutVector ]                                         ⎬ D
[ ]                                                                              ⎪
[ call InOutVector;                                                              ⎪
        if ChipType(ScaleXY) =>                                                  ⎪
            [ PassP(U,m); Enable(PopData); Enable(PushData) ] ]                  ⎪
[ ]                                                                              ⎪
[ next Start;                                                                    ⎪
        if ChipType(ScaleZ) =>                                                   ⎪
            [ PassP(U,m); Enable(PopData); Enable(PushData) ] ]                  ⎭

SCALE:
[       if CommType(ClosePoly) and Flags(NotHitTesting) =>                       ⎫
                [ Enable(CommandOut); next start ];                              ⎪
        if CommType(ClosePoly) and Flags(HitTesting) => next Start ]             ⎪
[       if Flags(NotHitTesting) => [ Enable(CommandOut); next doscale ];         ⎪
        if Flags(HitTesting) and CommType(DrawOrDrawp) => Enable(CommandOut);    ⎪
        if Flags(HitTesting) and CommType(Point) => Enable(CommandOut) ]         ⎪
[ if ChipType(ScaleZ) => call InputVector ]                                      ⎪
[ next Start]                                                                    ⎪
doscale:                                                                         ⎬ E
[       if ChipType(ScaleZ) =>  call InOutVector;                                ⎪
        if ChipType(ScaleXY) => call InputVector ]                               ⎪
[ ]                                                                              ⎪
(*    if x,y or z are zero, set characteristic equal to that of w    *)          ⎪
[ PassP(U,c); RtoB(w) ]                                                          ⎪
[ PassQ(B,c);                                                                    ⎪
            if Zero(x,tru) => Load(U,x,c);                                       ⎪
            if Zero(y,tru) => Load(U,y,c);                                       ⎪
            if Zero(z,tru) => Load(U,z,c) ]                                      ⎪
[ PassP(U,both); Load(D,all,both); RtoB(w) ]  (* w to U.x and U.y units *)       ⎪
[ PassQ(B,both); Load(U,all,both) ] (* D holds x,y,z,w;   U.* holds w *)         ⎪
[ PassQ(D,both); RtoB(z) ] (* transfer z to x unit if ScaleZ *)                  ⎭
```

```
[ PassQ(B,both);
        if ChipType(ScaleZ) => Load(D,all,both) ]
[ PassQ(S,m); Load(D,w,m); Load(D,z,m) ] (* Vsxy to D.z and D.w *)
[ MinusQ(D,m); Select(Rsign,m);
        if Sign(x,m,fls) => [ Load(D,x,m); Load(D,z,m) ];
        if Sign(y,m,fls) => [ Load(D,y,m); Load(D,w,m) ] ]
(* find characteristic difference for shift amount in U.x.c and U.y.c *)
[ PminusQ(U,D,c); Load(U,x,c); Load(U,y,c); Poke(SignC); PassP(U,m); RtoB(w) ]
        (* if shift amount is negative, x or y must be greater than w *)
[ PassQ(B,m); Select(Save, c);
        if Sign(x,c,tru) => Load(D,x,m);
        if Sign(y,c,tru) => Load(D,y,m) ]
[ Enable(Lit24ToB); PminusQ(U,B,c); Poke(SignC) ]
[ Enable(ZeroToB); PassQ(B,both); Load(A,z,m); Load(A,w,m); Select(Save,c);
        if Sign(x,c,fls) => [ Load(U,x,c); Load(D,x,m) ];
        if Sign(y,c,fls) => [ Load(U,y,c); Load(D,y,m) ] ]
ShLoop: (* shift dividend to align with w *)
[ Pminus1(U,c); Select(Rsign,c);
        if Sign(x,c,fls) => [ Shift(down,x); Load(U,x,c); next ShLoop ];
        if Sign(y,c,fls) => [ Shift(down,y); Load(U,y,c); next ShLoop ] ]
[ ]
[ PassQ(D,m); Load(A,x,m); Load(A,y,m) ]
[ MinusP(U,m); Load(D,x,m); Load(D,y,m);
        Enable(Lit24ToB); PassQ(B,c); Load(U,z,c) ]
DivMultLoop:
[ PplusQ(A,D,m); Select(Rsign,m); Select(Rsign,c); Pminus1(U,c);
        if Sign(z,c,fls) => next DivMultLoop;
        if Sign(x,m,fls) => [ Load(A,x,m); Load(A,z,m) ];
        if Sign(y,m,fls) => [ Load(A,y,m); Load(A,w,m) ];
        Shift(down,all); Load(U,z,c) ]
                (* (x/w)*Vsx and (y/w)*Vsy and (z/w)*Vsz are done *)
[ ]
[ PassQ(S,m); RtoB(x) ] (* Add Vcx *)
[ PplusQ(A,B,m); Load(A,z,m) ]
[ PassQ(S,m); RtoB(y) ] (* and Vcy *)
[ PplusQ(A,B,m); Load(A,w,m) ]
                (* Now output the results *)
[ if ChipType(ScaleZ) => call OutputVector;
        if ChipType(ScaleXY) => call InputVector ]
[ PassQ(U,m); Load(D,all,m);
        if ChipType(ScaleZ) => next start ] (*  Transfer z* and z to D  *)
[ PplusQ(A,D,m); RtoB(z); Enable(OutHigh) ] (*  Output High Xright bits *)
[ PplusQ(A,D,m); RtoB(z); Enable(OutLow) ] (*  Output Low Xright bits *)
[ PminusQ(A,D,m); RtoB(z); Enable(OutHigh) ] (*  Output High Xleft bits *)
[ PminusQ(A,D,m); RtoB(z); Enable(OutLow) ] (*  Output High Xleft bits *)
[ PassP(A,m); RtoB(w); Enable(CutHigh) ] (*   Output High y bits  *)
[ PassP(A,m); RtoB(w); Enable(OutLow) ] (*   Output Low y bits  *)
[ PassQ(D,m); RtoB(w); Enable(OutHigh) ] (*   Output High z bits  *)
[ PassQ(D,m); RtoB(w); Enable(OutLow); next Start ](*   Output Low z bits  *)
(******** Matrix Push, Pop, Load, Store and Mult Commands ********)

LOADMATRIX: (* Load new matrix in column order *)
[ ]
[ Enable(PopData); call InputVector;
    if ChipType(mm123) => Enable(CommandOut) ]
[ ]
[ PassP(U,both); Enable(PushData) ]
[       if ChipType(mm1) => [ Enable(Pass3V); Call PassN ];
        if ChipType(mm2) => [ Enable(Pass2V); Call PassN ];
        if ChipType(mm3) => [ call InOutVector ] ]
[ next Start ]

STOREMATRIX: (* store matrix in column order *)
[ Enable(CommandOut);
        if ChipType(MM) => next StoreMM ]
[  if ChipType(NotMM) => [ Enable(Pass4V); call PassN ] ]
[ next Start ]
StoreMM:
[ if ChipType(mm4) => [ Enable(Pass3V); call PassN ];
  if ChipType(mm3) => [ Enable(Pass2V); call PassN ];
  if ChipType(mm2) => call InOutVector ]
[ ]
[ PassQ(S,both); Load(A,all,both); call OutputVector ]
[ next Start ]

PUSHMATRIX:
[ ]
[ PassQ(S,both); Enable(PushData); next Start;
        if ChipType(mm123) => Enable(CommandOut) ]
POPMATRIX:
[ ]
[ Enable(PopData); next Start;
        if ChipType(mm123) => Enable(CommandOut) ]
```

```
(* Multiply incoming row-order matrix by existing matrix on top of stack *)
MULTMATRIX:
[ if ChipType(mm123) => [ Enable(CommandOut); call InOutVector ];
    if ChipType(mm4) => call InputVector ] (* Input is to U Register. *)
[ ] (* Save Top Matrix one down on stack for the new matrix. *)
[ PassQ(S,both); Enable(PushData); Load(D,all,both); call DotProd ]
[ ]
[ PassQ(S,both); Load(D,all,both) ] (* Current Matrix to D temporarily *)
[ Enable(PopData); PassQ(S,both); Load(A,all,both) ]
[ PassP(U,both); RtoB(w) ]
[ PassQ(B,both); Load(A,x,both) ]
[ PassP(A,both); Enable(PopData); Enable(PushData);
    if ChipType(mm123) => call InOutVector;
    if ChipType(mm4) => call InputVector ]
[ ](* Save current matrix on top of stack and compute next row of product *)
[ PassQ(D,both); Enable(PushData); call DotProd ]
[ ]
[ PassQ(S,both); Load(D,all,both) ]
[ Enable(PopData); PassQ(S,both); Load(A,all,both) ]
[ PassP(U,both); RtoB(w) ]
[ PassQ(B,both); Load(A,y,both) ]
[ PassP(A,both); Enable(PopData); Enable(PushData);
    if ChipType(mm123) => call InOutVector;
    if ChipType(mm4) => call InputVector ]
[ ]
[ PassQ(D,both); Enable(PushData); call DotProd ]
[ ]
[ PassQ(S,both); Load(D,all,both) ]
[ Enable(PopData); PassQ(S,both); Load(A,all,both) ]
[ PassP(U,both); RtoB(w) ]
[ PassQ(B,both); Load(A,z,both) ]
[ PassP(A,both); Enable(PopData); Enable(PushData);
    if ChipType(mm123) => call InOutVector;
    if ChipType(mm4) => call InputVector ]
[ call DotProd ]
[ ]
[ PassQ(S,both); Load(U,x,both); Load(U,y,both); Load(U,z,both) ]
[ PassP(U,both); Enable(PopData); Enable(PushData); next Start ]

DOCURVE:     (*    Iterate one step of a curve    *)
[ PassQ(S,both); Load(A,all,both);
        if ChipType(mm4) =>  Enable(DrawAssert);
        Enable(CommandOut) ]
[ PassP(A,both); RtoB(z) ]
[ PassQ(B,both); Load(U,w,both) ]
[ PassP(A,both); RtoB(y) ]
[ PassQ(B,both); Load(U,z,both) ]
[ PassP(A,both); RtoB(x) ]
[ Enable(PopData); PassQ(B,both); Load(U,y,both) ]
[ Enable(ZeroToB); PassQ(B,both); Load(U,x,both); call PreAdd ]
[ PplusQ(U,D,m); PassP(U,c); Load(D,all,both); call Normalize ]
[ PassP(U,both); Enable(PushData); next MDoutput ]

MOVEDRAWMM:
[ if CommType(ClosePoly) => [ Enable(CommandOut); next Start ];
        if CommType(Curve) => next DOCURVE; ]
[ Enable(CommandOut);
    if ChipType(mm123) => call InOutVector;
    if ChipType(mm4) => call InputVector ]
[ ]
[ PassQ(S,both); Load(D,all,both); call DotProd ]
MDoutput:
[   if ChipType(mm2) => [ Enable(Pass1C); call PassN ];
    if ChipType(mm3) => [ Enable(Pass2C); call PassN ];
    if ChipType(mm4) => [ Enable(Pass3C); call PassN ] ]
[ ]
[ PassP(U,both); RtoB(w); Enable(OutHigh) ]
[ PassP(U,both); RtoB(w); Enable(OutLow); next Start ]

(* Clipper Move, Draw Commands *)

MOVECLIPPER:
(* Leaves [x,y,z,w]1 on stack.  *)
[ call InputVector ] (* Input [x,y,z,w]1 to U registers. *)
        (* Make [x,y,z,W]1 in U, put [x,y,z,w]1 on stack. *)
[ ]
[ Enable(PopData); call MakeWEC; Enable(SetFirst) ]
[ Select(Usign,m); PassQ(S,both); Load(A,all,both);
        if Sign(w,m,fls) => [ Enable(CommandOut);
                              Enable(ClearFirst); call OutputVector ] ]
[ ]            (* Replace TOS with [x,y,z,W]1 *)
[ PassP(U,both); Enable(PopData); Enable(PushData)
        (* Push [x,y,z,W]1 down again if PolyMove command. *)
[ PassP(U,both); next Start;
        if CommType(Poly) => Enable(PushData) ]
```

```
CLIPPER:
(* Output intersection if closing line crosses plane and CLOSEPOLY Command. *)
[       if CommType(DrawORDrawp) => next DRAWCLIPPER;
        if CommType(MoveORMovep) => next MOVECLIPPER;
        if CommType(Point) => next MOVECLIPPER ]
(*    Must be a ClosePoly Command    *)
(*    P1 and Pn are on stack, see if they are on the same side of plane.    *)
[ PassQ(S,both); Load(D,all,both); Poke(SignM) ]
[ Enable(PopData); PassQ(S,both); Load(U,all,both); Select(Same,m);
        if Sign(w,m,tru) => next CloseIt ] (* both in or both out. *)
[ call DoClip ]
[ ]
[ Enable(PopData); PassP(U,both); Load(A,all,both);
        Enable(DrawAssert); Enable(CommandOut); call OutputVector ]
[ ]
[ Enable(PopData); Enable(CommandOut); next Start ]

CloseIt:
[ next Start;
    if Flags(FirstSent) => Enable(CommandOut) ]

DRAWCLIPPER:
[ call InputVector ] (* Input [x,y,z,w]2 to U registers *)
[ call MakeWEC ] (* Make [x,y,z,w]2 in U, put [x,y,z,w]2 on stack. *)
[ ]             (* Temporarily put [x,y,z,w]2 in A  *)
[ PassQ(S,both); Load(A,all,both) ]
        (* Pop stack to get [x,y,z,w]1 as TOS and into D *)
[ Enable(PopData); PassQ(S,both); Poke(SignM); Load(D,all,both) ]
[ PassP(U,both); Select(Same,m);
        if Sign(w,m,tru) => next SkipClose ]
[ call DoClip ]  (* signs are not the same, clip. *)
[ next Start ]
SkipClose:   (******* Signs are the same, both out or both in. *********)
[ ]
[ Select(Save,m); PassP(A,both);
        if Sign(w,m,tru) => next BothOut ]
        (* both points are in *)
[ Enable(CommandOut); call OutputVector ] (* Output A *)
BothOut:
[ ]            (* Replace TOS with [x,y,z,w]2 *)
[ PassP(U,both); Enable(PopData); Enable(PushData); next Start ]

DoClip:
(*   Set appropriate Hit Bit in the command register   *)
[ call ClipIt;  (* p2 and P2 get pushed onto stack by ClipIt *)
        if ChipType(Clip0) => Enable(Hit1);
        if ChipType(Clip1) => Enable(Hit2);
        if ChipType(Clip2) => Enable(Hit4);
        if ChipType(Clip3) => Enable(Hit8);
        if ChipType(Clip4) => Enable(Hit16);
        if ChipType(Clip5) => Enable(Hit32)  ]
[ if CommType(ClosePoly) => return ]
        (* if P1 was out, need Move Command, maybe. *)
        (* saved sign is complement of P1 sign. *)
[ PassP(U,both); Load(A,all,both); call OutputVector; Select(Save,m);
        if Sign(w,m,fls) and Flags(FirstNotSent) => Enable(MoveAssert);
        if Sign(w,m,fls) and CommType(NotPoly) => Enable(MoveAssert);
        Enable(ClearFirst); Enable(CommandOut) ]

SkipOutput:
        (* now output p2 if it was in *)
[ PassQ(S,both); Load(A,all,both); Poke(SignM) ]
[ Enable(PopData); PassQ(S,both); Load(D,all,both) ]
[ Enable(PopData) ]
[ Enable(PopData); PassP(A,both); Enable(PushData); (* TOS_P2 *)
        Select(Save,m); if Sign(w,m,tru) => return ]
[ PassQ(D,both); Load(A,all,both); Enable(CommandOut); call OutputVector ]
[ return ]
(******** Microcode Subroutines ********)
(* clipping subroutine -
    Inputs -
        U contains P2
        D contains P1
    Outputs -
        U contains intersection point
        A and U have been pushed onto the stack
        D, U and A are modified, D being completely lost.
        SignM is loaded with complement of P1.w.m sign.
*)
ClipIt:
[ ] (* Put on stack: p2, P2. *)
[ PassP(A,both); Enable(PushData) ] (* push [x,y,z,w]2 *)
[ PassP(U,both); Enable(PushData) ] (* push [x,y,z,w]2 *)
```

```
                    (* save P1 sign complemented, negate P1. *)
[ MinusQ(D,m); Poke(SignM); Load(D,all,m); call Normalize ]
[ ]
[ PassP(U,both); Load(A,all,both) ]
[ PassQ(S,both); Load(U,all,both); call PreAdd ]
                    (* Ready to form P2-P1. *)
[ ]                 (* null state, return from subroutine *)
                    (* if D..c>= 0, -P1..m is in U..m *)
                    (*find who is where, get P1 mantissa in A.all.m *)
[ PassQ(D,c); MinusP(U,m); Select( Rsign, c );
        if Sign( x, c, fls ) => Load( A, x, m );
        if Sign( y, c, fls ) => Load( A, y, m );
        if Sign( z, c, fls ) => Load( A, z, m );
        if Sign( w, c, fls ) => Load( A, w, m ) ]
[ PassQ(D,c); MinusQ(D,m); Select(Rsign, c);
        if Sign( x, c, tru ) => Load( A, x, m );
        if Sign( y, c, tru ) => Load( A, y, m );
        if Sign( z, c, tru ) => Load( A, z, m );
        if Sign( w, c, tru ) => Load( A, w, m ) ]
                    (* get P2-P1 mantissa in D.all.m *)
[ PplusQ(U,D,m); Load(D,all,m); Enable(Lit24ToB); PassQ(B,c); Load(A,x,c) ]
[ Shift(down,all) ] (* Form 1/2 of P2-P1 in D *)
ClipLoop:
[ Pminus1(A, c); PplusQ( A, D, m ); Shift(down, all ); Select(Same,m);
                  Select(Rsign,c);
            if Sign(w,m,fls) => Load(A, all, m ) ;
            if Sign(x,c,fls) => next ClipLoop; Load(A, x, c ) ]
[ ] (* fall out of loop into null state *)
[ PassP(A,m); PassP(U,c); Load(D,all,both) ]
[ ]                 (* Intersection point is in D.all.both, finish up *)
[ if ChipType(Even) => [ MinusQ(D,m); PassQ(D,c) ];
  if ChipType(Odd) => PassQ(D,both);
  if ChipType(Clip01) => RtoB(x); (* R is now U *)
  if ChipType(Clip23) => RtoB(y);
  if ChipType(Clip45) => RtoB(z) ]
[ PassQ(B,both); Load(D,w,both); next Normalize ]

(* PreAdd MicroSubroutine to align exponents for adding or subtracting.
                Input Operands are in the A and U registers of
                            each unit.
                On return,
                        A.all.m = same as before.
                        A.all.c = garbage.
                        D.all.m = shifted mantissa of # with
                                        least characteristic.
                        D.all.c = original A.all.c - U.all.c.
                        U.all.m = mantissa of # with larger characteristic.
                        U.all.c = characteristic of result.
*)
PreAdd:
[;] (* first handle zero case *)
[ PassP(A,c);
    if Zero(x,tru) => Load(U,x,c);
    if Zero(y,tru) => Load(U,y,c);
    if Zero(z,tru) => Load(U,z,c);
    if Zero(w,tru) => Load(U,w,c) ]
[ PassP(U, both); Load(D, all, both) ]
[ PassP(A,m); Load(U,all,m) ]
[ PassQ(D,c);
    if Zero(x,tru) => Load(A,x,c);
    if Zero(y,tru) => Load(A,y,c);
    if Zero(z,tru) => Load(A,z,c);
    if Zero(w,tru) => Load(A,w,c) ]
[ PassQ(D,both); Load(U,all,both) ]
[ PminusQ( A, D, c ); Load( D, all, c ); Poke( SignC ) ]
        (* put one with least characteristic in D.all.m, difference in D.all.c *)
[ PassP( A, both ); Select( Save, c );
    if Sign( x, c, tru ) => Load( D, x, m );
    if Sign( x, c, fls ) => Load( U, x, both );
    if Sign( y, c, tru ) => Load( D, y, m );
    if Sign( y, c, fls ) => Load( U, y, both );
    if Sign( z, c, tru ) => Load( D, z, m );
    if Sign( z, c, fls ) => Load( U, z, both );
    if Sign( w, c, tru ) => Load( D, w, m );
    if Sign( w, c, fls ) => Load( U, w, both ) ]
        (* put positive shift amount in A.all.c *)
[ PassQ( D, c ); Load( A, all, c ) ]
[ MinusP( A, c ); Select( Rsign, c );
    if Sign( x, c, fls ) => Load( A, x, c );
    if Sign( y, c, fls ) => Load( A, y, c );
    if Sign( z, c, fls ) => Load( A, z, c );
    if Sign( w, c, fls ) => Load( A, w, c ) ]
        (* clear count if too large *)
```

```
[ Enable( Lit24ToB ); PminusQ( A, B, c ); Poke( SignC ) ]
[ Enable( ZerotoB ); PassQ( B, both ); Select( Save, c );
    if Sign( x, c, fls ) => [ Load( A, x, c ); Load( D, x, m ) ];
    if Sign( y, c, fls ) => [ Load( A, y, c ); Load( D, y, m ) ];
    if Sign( z, c, fls ) => [ Load( A, z, c ); Load( D, z, m ) ];
    if Sign( w, c, fls ) => [ Load( A, w, c ) ; Load( D, w, m ) ] ]
                        (* shift mantissas down *)
ShiftLoop:
    [ Pminus1( A, c );  Load( A, all, c ); Select( Rsign, c );
        if Sign( x, c, fls ) => [ Shift( down, x ); next ShiftLoop ];
        if Sign( y, c, fls ) => [ Shift( down, y ); next ShiftLoop ];
        if Sign( z, c, fls ) => [ Shift( down, z ); next ShiftLoop ];
        if Sign( w, c, fls ) => [ Shift( down, w ); next ShiftLoop ] ]

[ return ]

InOutVector:
[ Enable(DataInput); Poke(InHigh) ]
[ Enable(DataInput); Poke(InLow); Enable(InputsToB); Enable(OutHigh) ]
[ Enable(DataInput); Poke(InHigh); PassQ(B,both); Load(U,x,both);
        Enable(InLowToB); Enable(OutLow) ]
[ Enable(DataInput); Poke(InLow); Enable(InputsToB); Enable(OutHigh) ]
[ Enable(DataInput); Poke(InHigh); PassQ(B,both); Load(U,y,both);
        Enable(InLowToB); Enable(OutLow) ]
[ Enable(DataInput); Poke(InLow); Enable(InputsToB); Enable(OutHigh) ]
[ Enable(DataInput); Poke(InHigh); PassQ(B,both); Load(U,z,both);
        Enable(InLowToB); Enable(OutLow) ]
[ Enable(DataInput); Poke(InLow); Enable(InputsToB); Enable(OutHigh) ]
[ PassQ(B,both); Load(U,w,both);
        Enable(InLowToB); Enable(OutLow); return ]

InputVector: (* 8 terms, 8 states *)
        (* Note: InputsToB is not pipelined *)
[ Enable(DataInput); Poke(InHigh) ]
[ Enable(DataInput); Enable(InputsToB) ]
[ Enable(DataInput); Poke(InHigh); PassQ(B,both); Load(U,x,both) ]
[ Enable(DataInput); Enable(InputsToB) ]
[ Enable(DataInput); Poke(InHigh); PassQ(B,both); Load(U,y,both) ]
[ Enable(DataInput); Enable(InputsToB) ]
[ Enable(DataInput); Poke(InHigh); PassQ(B,both); Load(U,z,both) ]
[ Enable(DataInput); Enable(InputsToB) ]
[ PassQ(B,both); Load(U,w,both); return ]

OutputVector:  (* 9 terms, 9 states *)
[ ]
[ PassP(A,both); RtoB(x); Enable(OutHigh) ]
[ PassP(A,both); RtoB(x); Enable(OutLow) ]
[ PassP(A,both); RtoB(y); Enable(OutHigh) ]
[ PassP(A,both); RtoB(y); Enable(OutLow) ]
[ PassP(A,both); RtoB(z); Enable(OutHigh) ]
[ PassP(A,both); RtoB(z); Enable(OutLow) ]
[ PassP(A,both); RtoB(w); Enable(OutHigh) ]
[ PassP(A,both); RtoB(w); Enable(OutLow); return ]
(************ Microcode routine:
        Make Window Edge Coordinate.
        Input is in U.all.both
        Returns with original U pushed onto stack and x,y,z,w in U.all.both.
        Destroys A
*************)
MakeWEC:
[ ] (* Save original coordinate on stack, copy to A. *)
[ PassP(U,both); Enable(PushData); Load(A,all,both);
        (*Form window edge coord in w unit. *)
    if ChipType(Clip01) => RtoB(x); (* R is now U *)
    if ChipType(Clip23) => RtoB(y);
    if ChipType(Clip45) => RtoB(z) ]
[ PassQ(B,both); Load(U,w,both) ]
        (* clear the other components *)
[ Enable(ZeroToB); PassQ(B,both); Load(U,x,both); Load(U,y,both);
            Load(U,z,both) ]
[ Enable(ZeroToB); PassQ(B,both); Load(A,x,both); Load(A,y,both);
            Load(A,z,both) ]
(***** Normalization required in this state ???? because of negation ? *)
[       MinusP(U,m); call PreAdd;
        if ChipType(Odd) => Load(U,w,m) ]
[ ]
[ PplusQ(U,D,m); PassP(U,c);  Load(D,w,both) ]
            (* Now put x,y,z with w all in D *)
[ PassQ(S,both);Load(D,x,both);Load(D,y,both);Load(D,z,both); next Normalize ]

(*********** Dot Product microcode subroutine:
        Input numbers in U and D.
        Output result in U.
        Destroys A, leaves S unaltered.
*************)
```

```
DotProd: (* 37 and terms, 21 states. *)
     [ ]
     [ Enable( ZeroToB ); PassQ(B, m); PplusQ(U, D, c);
          Load(A, all, both); Shift(up,all) ]
     [ MinusQ( D, m ); Shift(down, all ); Select( Usign, m );
          if Sign(x,m,tru) => Load(A,x,m);
          if Sign(y,m,tru) => Load(A,y,m);
          if Sign(z,m,tru) => Load(A,z,m);
          if Sign(w,m,tru) => Load(A,w,m); Shift(up,all) ]
MultLoop:
     [ PplusQ(A,D,m); Shift(down,all); Select( Usign, m );
          if Sign(x,m,tru) => Load(A,x,m);
          if Sign(y,m,tru) => Load(A,y,m);
          if Sign(z,m,tru) => Load(A,z,m);
          if Sign(w,m,tru) => Load(A,w,m); Shift(up,all);
          if Zero(x,fls) or Zero(y,fls) or
                    Zero(z,fls) or Zero(w,fls)=> next MultLoop ]
     [ ]
     [ PassP(A,both); Load(U,all,both) ]
     [ Enable(ZerotoB); PassQ(B,c);
          if Zero(x,tru) => Load(U,x,c);
          if Zero(y,tru) => Load(U,y,c);
          if Zero(z,tru) => Load(U,z,c);
          if Zero(w,tru) => Load(U,w,c) ]
NormLoop:
     [ Pminus1(U,c);
          if Norm(up,x) and Zero(x,fls) =>
               [ Shift(up,x); Load(U,x,c); next NormLoop ];
          if Norm(up,y) and Zero(y,fls) =>
               [ Shift(up,y); Load(U,y,c); next NormLoop];
          if Norm(up,z) and Zero(z,fls) =>
               [ Shift(up,z); Load(U,z,c); next NormLoop ];
          if Norm(up,w) and Zero(w,fls) =>
               [ Shift(up,w); Load(U,w,c); next NormLoop ] ]
[ ] (* null state at end of loop *)
[ PassP(U,both); RtoB(x) ] (* Put U.x onto B bus *)
[ PassQ(B,both); Load(A,y,both) ]
[ PassP(U,both); RtoB(z) ]
[ PassQ(B,both); Load(A,w,both) ]
[ Enable(ZerotoB); PassQ(P,both); Load(U,x,both); Load(U,z,both);
     call PreAdd ]
[ ] (* result of add is in U.y and U.w *)
[ PplusQ(U,D,m); PassP(U,c); Load(D,all,both); call Normalize ]
[ ] (* result of normalization is in U. *)
[ PassP(U,both); RtoB(y) ] (* put U.y onto B bus *)
[ PassQ(B,both); Load(A,w,both) ]
[ Enable(ZerotoB); PassQ(B,both); Load(U,x,both);
               Load(U,y,both); Load(U,z,both); call PreAdd ]
[ ]
[ PplusQ(U,D,m); PassP(U,c); Load(D,all,both); next Normalize ]
(*********** Normalize routine:
     Input is in D register. Output is in U register.
***********)
Normalize: (* 13 and terms, 5 states. *)
[] (* normalize downward first. *)
[ PassQ( D, both ); Load( U, all, both ) ]
[ Pplus1( U, c );     (* normalize down if necessary *)
     if Norm( down, x ) => [ Shift(down, x ); Load( U, x, c ) ];
     if Norm( down, y ) => [ Shift(down, y ); Load( U, y, c ) ];
     if Norm( down, z ) => [ Shift(down, z ); Load( U, z, c ) ];
     if Norm( down, w ) => [ Shift(down, w ); Load( U, w, c ) ] ]
[ PassQ( D, m ); Load(U, all, m)] (* now normalize up *)
NormLoop2:
     [ Pminus1( U, c );
          if Norm( up, x ) and Zero( x, fls ) =>
               [ Shift(up, x ); Load( U, x, c ); next NormLoop2 ];
          if Norm( up, y ) and Zero( y, fls ) =>
               [ Shift(up, y ); Load( U, y, c ); next NormLoop2 ];
          if Norm( up, z ) and Zero( z, fls ) =>
               [ Shift(up, z ); Load( U, z, c ); next NormLoop2 ];
          if Norm( up, w ) and Zero( w, fls ) =>
               [ Shift(up, w ); Load( U, w, c ); next NormLoop2 ] ]
[ ]
[ Enable(ZerotoB); PassQ(B,c); return;
     if Zero(x,tru) => Load(U,x,c);
     if Zero(y,tru) => Load(U,y,c);
     if Zero(z,tru) => Load(U,z,c);
     if Zero(w,tru) => Load(U,w,c) ]
TheEnd:[ StateEnd; Enable(CloseOutput) ]
```

What is claimed is:

1. A processor for use in a geometric processing system comprising a plurality of identical function units, each of said function units operating on multiple bit data and comprising a plurality of one bit slice circuits each including arithmetic logic means for operating on a bit of said data with each of one bit slice circuit interconnected with like circuits including at least one lower order circuit for operating on a lower order bit an at least one higher order circuit for operating on a higher order bit of said multiple bit data, each of said one bit slice circuits including a multiple level storage means which cooperatively functions as a dispersed data stack for said function unit, each one bit slice circuit comprising

- a single bit arithmetic logic unit having a first ALU input, a second ALU input, and an ALU output,
- a first bus for transferring a data bit to said first ALU input,
- a second bus for transferring a data bit to said second ALU input,
- a third bus for transferring a data bit from said ALU output,
- an upshifting register having an input and first and second outputs, said input operably connected to receive a data bit from a lower order circuit and said first output transferring the data bit to said first bus, and said first input operably connected to receive a data bit from said third bus and said second output transferring the data bit to a higher order circuit,
- a downshifting register having an input and first and second outputs operably connected to receive a data bit from a higher order circuit and transferring the data bit to said second bus, and said first input operably connected to receive a data bit from said third bus and said second output transferring the data bit to a lower order circuit,
- an accumulator register interconnected between said third bus and said first bus for receiving a data bit from said ALU output and applying said data bit to said first ALU input,
- an interface register connected to said second bus for transferring a data bit from an input/output bus to said second bus, and
- a multiple level register interconnected with said second and said third bus for saving and restoring bits for processing, and
- control means for controlling said function units to cooperatively provide at least a portion of one of the functions including matrix transformations, clipping and scaling functions.

2. A geometric processing system for receiving geometric data, transforming coordinates of said geometric data, clipping said transformed data for selective presentation on a viewing screen, and scaling said data for presentation on said viewing screen, comprising

- a first plurality of processor units for transforming coordinates of said geometric data,
- a second plurality of processors operably connected with said first plurality of processor units for receiving and clipping transformed coordinates for selective viewing of the geometric data, and
- a third plurality of processorss operably connected with said second plurality of processor units for scaling said clipped data,
- each of said processor units comprising a plurality of function units, each of said function units operating on multiple bit data and comprising a plurality of one bit slice circuits each including arithmetic logic means for operating on a bit of said data with each of one bit slice circuit interconnected with like circuits including at least one lower order circuit for operating on a lower order bit and at least one higher order circuit for operating on a higher order bit of said multiple bit data, each of said one bit slice circuits including a multiple level storage means which cooperatively function as a dispersed data stack for said function unit, and control means for controlling said function units to cooperatively provide at least a portion of one of the functions including matrix transformations, clipping, and scaling functions.

3. A geometric processing system as defined by claim 2 wherein each one bit slice circuit comprises

- a single bit arithmetic logic unit having a first ALU input, a second ALU input, and an ALU output,
- a first bus for transferring a data bit to said first ALU input,
- a second bus for transferring a data bit to said second ALU input,
- a third bus for transferring a data bit from said ALU output,
- an upshifting register having an input and first and second outputs, said input operably connected to receive a data bit from a lower order circuit and said first output transferring the data bit to said first bus, and said first input operably connected to receive a data bit from said third bus and said second output transferring the data bit to a higher order circuit,
- a downshifting register having an input and, first and second outputs operably connected to receive a data bit from a higher order circuit and transferring the data bit to said second bus, and said first input operably connected to receive a data bit from said third bus and said second output transferring the data bit to a lower order circuit,
- an accumulator register interconnected between said third bus and said first bus for receiving a data bit from said ALU output and applying said data bit to said first ALU input,
- an interface register connected to said second bus for transferring a data bit from an input/output bus to said second bus, and
- a multiple level register interconnected with said second and said third bus for saving and restoring bits for processing.

4. A processor for use in a geometric processing system comprising a plurality of identical floating point function units (W, X, Y, Z), each function unit including a first portion for operating on the mantissa of a floating point number and a second portion for operating on the characteristic of a floating point number,

- each portion of a function unit including a plurality of identical circuits for operating on multiple bit data, each circuit comprising
  - an arithmetic logic unit having a first ALU input, a second ALU input, and an ALU output,
  - a first bus for transferring data to said first ALU input,
  - a second bus for transferring data to said second ALU input,
  - a third bus for transferring data from said ALU output,
  - an upshifting register having an input and first and second outputs, said input operably connected to receive data from a lower order circuit and said first output transferring the data to said first bus, and said input operably connected to receive data from said third bus and said second output transferring the databit to a higher order circuit,
  - a downshifting register having an input and first and second outputs, said input operably connected to receive data from a higher order circuit and said first output transferring the data to said second bus, and said input operably connected to receive data from said third bus and said second output transferring the data to a lower order circuit, an accumulator register interconnected between said third bus and said first bus for receiving data from said ALU output and applying said data to said first ALU input, an interface register connected to said second bus for transferring data from an input/output bus to said second bus, a multiple level register interconnected with said second and said third bus for saving and restoring data for processing, and control means for controlling said function units to cooperatively provide at least a portion of one of the functions including matrix transformations, clipping, and scaling functions.

5. A geometric processing system having multiple identical pipelined processors for receiving geometric data, transforming coordinates of said geometric data, clipping said transformed data, and scaling said clipped data, said system comprising a first plurality of serially connected processors for receiving and transforming coordinates of said geometric data, a second plurality of serially connected processors serially connected with said first plurality of serially connected processors for receiving and clipping transformed coordinates, and a third plurality of serially connected processors serially connected with said second plurality of serially connected processors for scaling said clipped data, each of said processors comprising a plurality of function units (W, X, Y, Z), each function unit including a first portion for operating on the mantissa of a floating point number and a second portion for operating on the characteristic of a floating point number, and control means for controlling said function units to cooperatively provide at least a portion of one of the functions including matrix transformations, clipping, and scaling functions.

6. The system as defined by claim 5 wherein each portion of a function unit includes a plurality of identical circuits for operating on multiple bit data, each circuit comprising an arithmetic logic unit having a first ALU input, a second ALU input, and an ALU output a first bus for transferring data to said first ALU input, a second bus for transferring data to said second ALU input, a third bus for transferring data from said ALU output, an upshifting register having an input and first and second outputs, said input operably connected to receive data from a lower order circuit and said first output transferring the data to said first bus, and said input operably connected to receive data from said third bus and said second output transferring the data bit to a higher order circuit, a downshifting register having an input and first and second outputs, said input operably connected to receive data from a higher order circuit and said first output transferring the data to said second bus, and said input operably connected to receive data from said third bus and said second output transferring the data to a lower order circuit, an accumulator register interconnected between said third bus and said first bus for receiving data from said ALU output and applying said data to said first ALU input, an interface register connected to said second bus for transferring data from an input/output bus to said second bus, and a multiple level register interconnected with said second and said third bus for saving and restoring data for processing.

* * * * *